United States Patent
Murren et al.

(10) Patent No.: US 7,346,921 B2
(45) Date of Patent: Mar. 18, 2008

(54) DEFINITION OF LOW-LEVEL SECURITY RULES IN TERMS OF HIGH-LEVEL SECURITY CONCEPTS

(75) Inventors: Brian T. Murren, Clifton Park, NY (US); Thomas R. Kiehl, Wynantskill, NY (US)

(73) Assignee: GE Capital Corporation, Stamford, CT (US)

(*) Notice: Subject to any disclaimer, the term of this patent is extended or adjusted under 35 U.S.C. 154(b) by 827 days.

(21) Appl. No.: 09/847,037

(22) Filed: Apr. 30, 2001

(65) Prior Publication Data

US 2003/0167401 A1    Sep. 4, 2003

(51) Int. Cl.
G06F 17/00    (2006.01)

(52) U.S. Cl. .................. 726/1; 713/156; 713/166; 705/51

(58) Field of Classification Search .......... 713/200, 713/156, 166; 709/9, 249; 705/76, 50, 51; 726/26, 8–29, 1; 707/9, 10
See application file for complete search history.

(56) References Cited

U.S. PATENT DOCUMENTS

| | | | |
|---|---|---|---|
| 5,265,221 A * | 11/1993 | Miller | ................. 711/163 |
| 5,410,646 A | 4/1995 | Tondevold et al. | |
| 5,434,776 A | 7/1995 | Jain | |
| 5,590,197 A | 12/1996 | Chen et al. | |
| 5,678,039 A | 10/1997 | Hinks et al. | |
| 5,704,029 A | 12/1997 | Wright, Jr. | |
| 5,745,754 A | 4/1998 | Lagarde et al. | |
| 5,790,790 A | 8/1998 | Smith et al. | |
| 5,790,809 A | 8/1998 | Holmes | |
| 5,835,896 A | 11/1998 | Fisher et al. | |
| 5,870,605 A | 2/1999 | Bracho et al. | |
| 5,890,175 A | 3/1999 | Wong et al. | |
| 5,898,836 A | 4/1999 | Freivald et al. | |
| 5,915,209 A | 6/1999 | Lawrence | |
| 5,928,335 A | 7/1999 | Morita | |
| 5,970,231 A | 10/1999 | Crandall | |
| 5,977,971 A | 11/1999 | Guzak et al. | |
| 5,978,799 A | 11/1999 | Hirsch | |
| 5,999,948 A | 12/1999 | Nelson et al. | |
| 6,035,121 A | 3/2000 | Chiu et al. | |
| 6,047,377 A * | 4/2000 | Gong | ................. 713/201 |
| 6,058,417 A | 5/2000 | Hess et al. | |
| 6,061,686 A | 5/2000 | Gauvin et al. | |
| 6,115,690 A | 9/2000 | Wong | |
| 6,128,655 A | 10/2000 | Fields et al. | |
| 6,144,944 A | 11/2000 | Kurtzman, II et al. | |
| 6,151,022 A | 11/2000 | Alshibani et al. | |

(Continued)

OTHER PUBLICATIONS

Belge, "The Next Step in Software Internationalization," Jan. 1995, ACM Press Interactions, vol. 2, Issue 1, pp. 21-25, ISSN: 1072-5520.

(Continued)

*Primary Examiner*—T. B. Truong
(74) *Attorney, Agent, or Firm*—Lee & Hayes, PLLC

(57) ABSTRACT

A set of pluggable rules are used to define low-level security rules in terms of high-level security concepts. The rules are part of a pluggable module that can interact with a business logic to provide different granularities of control.

27 Claims, 9 Drawing Sheets

U.S. PATENT DOCUMENTS

| | | | |
|---|---|---|---|
| 6,175,841 B1 | 1/2001 | Loiacono | |
| 6,192,407 B1 | 2/2001 | Smith et al. | |
| 6,216,114 B1 | 4/2001 | Alaia et al. | |
| 6,233,566 B1 | 5/2001 | Levine et al. | |
| 6,243,721 B1 | 6/2001 | Duane et al. | |
| 6,252,589 B1 | 6/2001 | Rettig et al. | |
| 6,253,251 B1* | 6/2001 | Benantar et al. | 719/315 |
| 6,292,827 B1 | 9/2001 | Raz | |
| 6,308,212 B1 | 10/2001 | Besaw et al. | |
| 6,345,278 B1 | 2/2002 | Hitchcock et al. | |
| 6,366,891 B1 | 4/2002 | Feinberg | |
| 6,385,724 B1* | 5/2002 | Beckman et al. | 713/167 |
| 6,412,008 B1 | 6/2002 | Fields et al. | |
| 6,415,284 B1 | 7/2002 | D'Souza et al. | |
| 6,434,568 B1 | 8/2002 | Bowman-Amuah | |
| 6,438,594 B1 | 8/2002 | Bowman-Amuah | |
| 6,460,036 B1 | 10/2002 | Herz | |
| 6,473,748 B1* | 10/2002 | Archer | 706/45 |
| 6,473,791 B1* | 10/2002 | Al-Ghosein et al. | 709/217 |
| 6,477,665 B1 | 11/2002 | Bowman-Amuah | |
| 6,487,599 B1 | 11/2002 | Smith et al. | |
| 6,487,665 B1* | 11/2002 | Andrews et al. | 713/201 |
| 6,513,038 B1 | 1/2003 | Hasegawa et al. | |
| 6,519,570 B1 | 2/2003 | Faber et al. | |
| 6,519,571 B1 | 2/2003 | Guheen et al. | |
| 6,529,950 B1* | 3/2003 | Lumelsky et al. | 709/218 |
| 6,529,956 B1 | 3/2003 | Smith et al. | |
| 6,546,397 B1 | 4/2003 | Rempell | |
| 6,549,397 B1 | 4/2003 | Diaz et al. | |
| 6,560,592 B1* | 5/2003 | Reid et al. | 707/2 |
| 6,567,846 B1 | 5/2003 | Garg et al. | |
| 6,611,498 B1 | 8/2003 | Baker et al. | |
| 6,615,253 B1 | 9/2003 | Bowman-Amuah | |
| 6,623,529 B1 | 9/2003 | Lakritz | |
| 6,625,581 B1 | 9/2003 | Perkowski | |
| 6,631,357 B1 | 10/2003 | Perkowski | |
| 6,632,251 B1 | 10/2003 | Rutten et al. | |
| 6,636,886 B1 | 10/2003 | Katiyar et al. | |
| 6,643,652 B2 | 11/2003 | Helgeson et al. | |
| 6,654,726 B1 | 11/2003 | Hanzek | |
| 6,662,342 B1 | 12/2003 | Marcy | |
| 6,664,981 B2 | 12/2003 | Ashe et al. | |
| 6,671,674 B1 | 12/2003 | Anderson et al. | |
| 6,684,369 B1 | 1/2004 | Bernardo et al. | |
| 6,694,506 B1* | 2/2004 | LeBlanc et al. | 717/108 |
| 6,704,906 B1 | 3/2004 | Yankovich et al. | |
| 6,728,685 B1 | 4/2004 | Ahluwalia | |
| 6,732,331 B1 | 5/2004 | Alexander | |
| 6,741,969 B1 | 5/2004 | Chen et al. | |
| 6,741,980 B1 | 5/2004 | Langseth et al. | |
| 6,742,015 B1 | 5/2004 | Bowman-Amuah | |
| 6,745,203 B1 | 6/2004 | Garg et al. | |
| 6,751,673 B2 | 6/2004 | Shaw | |
| 6,769,009 B1 | 7/2004 | Reisman | |
| 6,771,384 B1 | 8/2004 | Laverty et al. | |
| 6,779,155 B1* | 8/2004 | Bahrs et al. | 715/526 |
| 6,785,721 B1 | 8/2004 | Immerman et al. | |
| 6,792,462 B2* | 9/2004 | Bernhardt et al. | 709/225 |
| 6,802,059 B1 | 10/2004 | Lyapustina et al. | |
| 6,807,558 B1 | 10/2004 | Hassett et al. | |
| 6,820,082 B1* | 11/2004 | Cook et al. | 707/9 |
| 6,832,369 B1 | 12/2004 | Kryka et al. | |
| 6,842,906 B1 | 1/2005 | Bowman-Amuah | |
| 7,013,289 B2 | 3/2006 | Horn et al. | |
| 2001/0039594 A1 | 11/2001 | Park et al. | |
| 2001/0044809 A1 | 11/2001 | Parasnis et al. | |
| 2002/0107684 A1 | 8/2002 | Gao | |
| 2002/0147656 A1 | 10/2002 | Tam et al. | |
| 2002/0156678 A1 | 10/2002 | Adams | |
| 2002/0161674 A1 | 10/2002 | Scheer | |
| 2003/0033448 A1 | 2/2003 | Kieffer | |
| 2003/0078960 A1 | 4/2003 | Murren et al. | |
| 2003/0233296 A1 | 12/2003 | Wagner | |
| 2004/0039993 A1 | 2/2004 | Kouglouris et al. | |
| 2004/0205575 A1 | 10/2004 | Wattenberg | |
| 2004/0205644 A1 | 10/2004 | Shaughnessy et al. | |
| 2005/0055633 A1 | 3/2005 | Ali et al. | |

OTHER PUBLICATIONS

"Borland's Paradox for Windows User's Guide", Borland International, Inc, 1994, 23 pages.
Bragg, "Accounting Best Practices," John Wiley and Sons, Inc. 1999, 289 pages.
de Mauro, "Internationalizing Messages in Linus Programs," Mar. 1999, Specialized Systems Consultants Inc., Linux Journal, vol. 1999, Issue 59es, Article No. 4, ISSN 1075-3583, 10 pages.
Derfler, et al., "How Networks Work," Millennium Ed., Euq Corporation, Jan. 2000, 19 pages.
"Developer's Guide to Internationalization," 1995 Sun Microsystems, 96 pages.
Gavron, et al., "How to Use Microsoft Windows NT 4 Workstation," Macmillian Computer Publishing, USA, 1996, 197 pages.
Gilly, "Unix in a Nutshell: A Desktop Quick Reference for System V and Solaris 2.0," Cambridge: O'Reilly, 1992, 4 pages.
Gralla, "How the Internet Works," Millennium Ed., Que Corporation, Aug. 1999, 28 pages.
Lemay, et al., "Laura Lemay's Workshop Javascript," 1996, Sams. net, pp. 132-137.
Lawhead, "Flexible Formatting of Messages for Display," Jun. 1, 1971, IBM Technical Disclosure Bulletin, vol. 14, Issue 1, pp. 46-48.
Muller, " Desktop Encyclopedia of the Internet," Artech House, Inc., 1998, 499 pages.
"OpenWindows Developer's Guide: XView Code Generator Programmer's Guide," 1994 Sun Microsystems Product Manual ,Chapter 1, and Appendix B, pp. 1-3 and 95-106.
Peek, et al. "Unix Power Tools," Cambridge: O'Reilly, 1997, 2nd Edition, 6 pages.
Pominville, et al., "A Framework for Optimizing Java Using Attributes," IBM Centre for Advanced Studies Conference, 2000, pp. 1-17.
Robbins, "Effective awk Programming," May 2001, O'Reilly & Associates, ISBN: 0-596-00070-7, Chapter 9, 15 pages.
Robbins, "Gawk 3.1 New Feature List," Sep. 3, 2000, Usenet newsgroup comp.lang.awk as archived on <<http://groups.google.com>>, accessed and printed on Mar. 18, 2005, 3 pages.
"SMT in Line", available at <<www.smtinline.com>>, accessed on Apr. 28, 2006, 2 pages.
Stephens, "Prototyping with Visual Basic," Sep. 2001, Sams Publishing, ISBN 0-7897-2578-9, Chapter 9, 6 pages.
Stevens, "Unix Network Programming," New Jersey: Prentice Hall 1990, 44 pages.
Tuthill, et al, "Creating Worldwide Software: Solaris International Developer's Guide," Sun Microsystems Press, 1997, 2nd Edition, 13 pages.
Usdin, et al., "XML: Not A Silver Bullet, But a Great Pipe Wrench", Published by Standard View, vol. 6, No. 3, Sep. 1998, pp. 125-132.
White, "How Computers Work", Millennium Ed. Que Corporation, Sep. 1999, 38 pages.

* cited by examiner

DEFINITION OF LOW-LEVEL SECURITY RULES IN TERMS OF HIGH-LEVEL SECURITY CONCEPTS

TECHNICAL FIELD

The present invention is directed to security, and more particularly to defining low-level security rules in terms of high-level security concepts.

BACKGROUND

Computer programs are traditionally developed by the writing of source code for components of the program that include a main module and various other modules functions, or subroutines that are invoked by the main module. The source code of components of computer programs are typically developed specifically for the domain of one computer program. As a result, one computer program might not be able to use components developed specifically for another computer program. Although some utility components (e.g., sort routines) can be reused by different computer programs, they are typically very low-level components that are not related to the domain of the computer program. Because of the inability to reuse high-level components for multiple computer programs, the cost of developing a computer program can be quite high. In addition, because the components are new, their reliability is unproved.

Many techniques have been developed to facilitate the reusability and reliability of software components. One well-known technique is object-oriented programming. Object-oriented programming allows a programmer to define a type of component, known as an "object." Each type of object has a defined interface with a defined behavior. A programmer can develop a computer program to use the interfaces of objects that have been developed by other programmers to provide that behavior within the computer program. The behavior of an object is provided by methods (or member functions), and the data of an object is provided as attributes (or data members). Some object-oriented programming languages allow attributes to be set and retrieved directly (e.g., "object.attribute1=15"), while other object-oriented programming languages only allow attributes to be set and retrieved indirectly through methods (e.g., "object-.setAttribute1(15)"). The methods for setting attributes are referred to as "set methods" and for retrieving attributes are referred to as "get methods."

Although object-oriented programming techniques have helped increase the reusability and reliability software components, it is still very expensive to develop a computer program even using these reusable components. Part of the expense is attributable to the need of a computer programmer to know and understand all the interfaces of the components in order to integrate the components into the desired computer program. It would be desirable to have a programming technique that would increase reusability and reliability of the software components while reducing the overall expense of developing computer programs.

One specific situation where problems arise is in security enforcement. Security is important in a wide variety of types of programs, such as access to items in a database—the program designer may want to assign different security access to different users of and different items in the database. One solution to providing security enforcement is to implement a fixed security scheme in which fixed rules are added to the program to limit access as desired. However, such fixed rules can be difficult to change and do not easily port over to other programs. Another solution is to implement the security enforcement in the underlying component being accessed (e.g., a database). However, this solution suffers from the same problem of being difficult to change and not easily ported over to other programs.

Thus, a need remains for a security enforcement technique that allows for easier changing of the security to accommodate different environments (e.g., databases storing different types of information or items) as well as to be able to easily apply the security enforcement to different programs with reduced overall expense.

SUMMARY

Definition of low-level security rules in terms of high-level security concepts is described herein.

A set of pluggable rules are used to define low-level security rules in terms of high-level security concepts. The rules are part of a pluggable module that can interact with a business logic to provide different granularities of control.

BRIEF DESCRIPTION OF THE DRAWINGS

The same reference numbers are used throughout the figures to reference like components and features.

DETAILED DESCRIPTION

A software architecture specifies distinct layers or modules that interact with each other according to a well-defined specification to facilitate efficient and timely construction of business processes and server applications for many diverse domains. Examples of possible domains include asset management, leasing and lending, insurance, financial management, asset repair, inventory tracking, other business-oriented domains, and so forth. The architecture implements a common infrastructure and problem-solving logic model using a domain framework. By partitioning the software into a hierarchy of layers, individual modules may be readily "swapped out" and replaced by other modules that effectively adapt the architecture to different domains.

With this architecture, developers are able to create different software applications very rapidly by leveraging the common infrastructure. New business models can be addressed, for example, by creating new domain frameworks that "plug" into the architecture. This allows developers to modify only a portion of the architecture to construct new applications, resulting in a fraction of the effort that would be needed to build entirely new applications if all elements of the application were to be constructed.

Exemplary System

Figure 1:
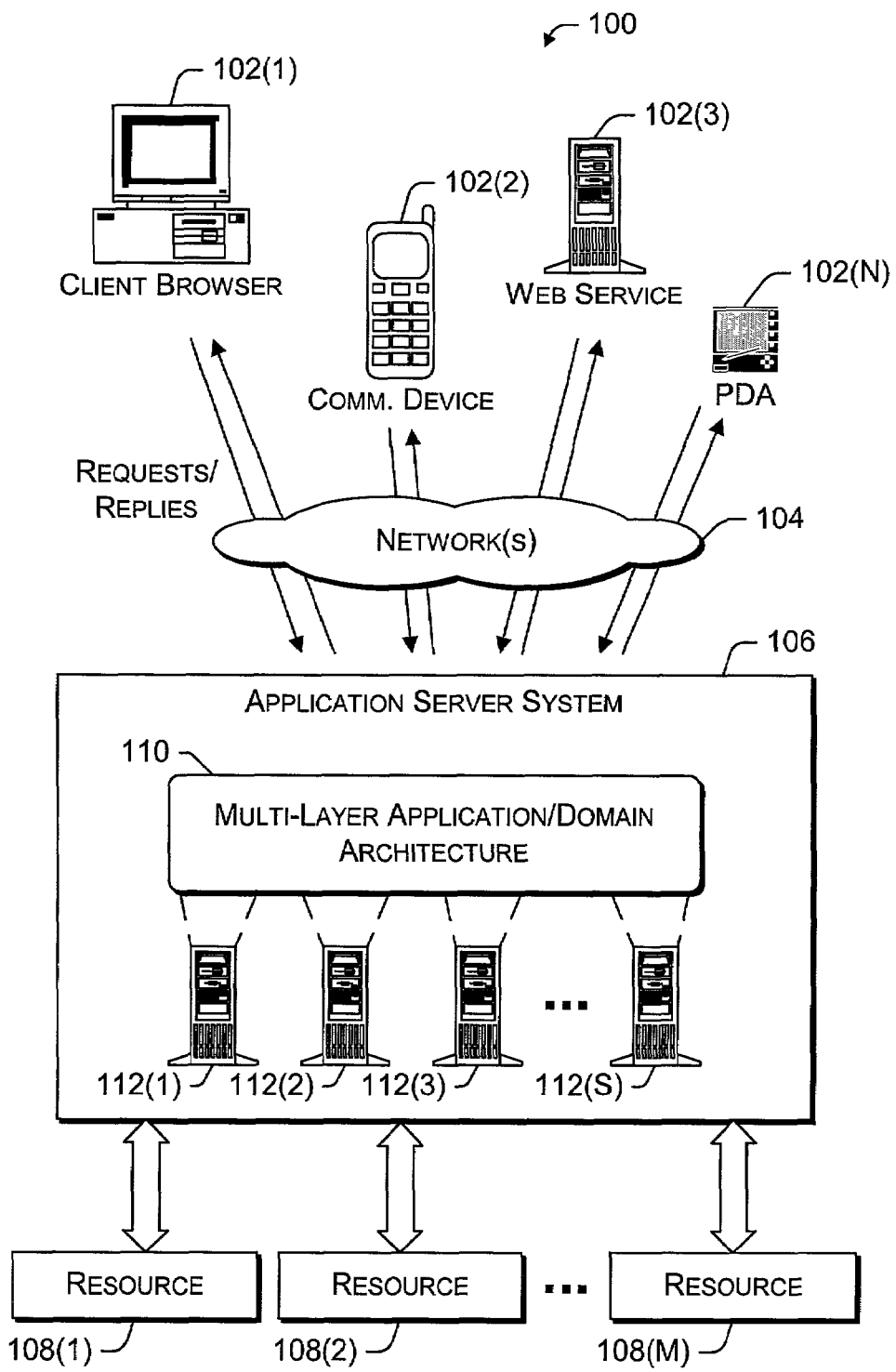
FIG. 1 illustrates a network system that implements a server application architecture that may be tailored to various domains.

FIG. 1 shows a network system 100 in which the tiered software architecture may be implemented. The system 100 includes multiple clients 102(1), 102(2), 102(3), . . . , 102(N) that submit requests via one or more networks 104 to an application server system 106. Upon receiving the requests, the server system 106 processes the requests and returns replies to the clients 102 over the network(s) 104. In some situations, the server system 106 may access one or more resources 108(1), 108(2), . . . , 108(M) to assist in preparing the replies.

The clients 102 may be implemented in a number of ways, including as personal computers (e.g., desktop, laptop, palmtop, etc.), communications devices, personal digital assistants (PDAs), entertainment devices (e.g., Web-enabled televisions, gaming consoles, etc.), other servers, and so forth. The clients 102 submit their requests using a number of different formats and protocols, depending upon the type of client and the network 104 interfacing a client and the server 106.

The network 104 may be implemented by one or more different types of networks (e.g., Internet, local area network, wide area network, telephone, etc.), including wire-based technologies (e.g., telephone line, cable, etc.) and/or wireless technologies (e.g., RF, cellular, microwave, IR, wireless personal area network, etc.). The network 104 can be configured to support any number of different protocols, including HTTP (HyperText Transport Protocol), TCP/IP (Transmission Control Protocol/Internet Protocol), WAP (Wireless Application Protocol), and so on.

The server system 106 implements a multi-layer software architecture 110 that is tailored to various problem domains, such as asset management domains, financial domains, asset lending domains, insurance domains, and so forth. The multi-layer architecture 110 resides and executes on one or more computers, as represented by server computers 112(1), 112(2), 112(3), . . . , 112(S). The tiered architecture 110 may be adapted to handle many different types of client devices 102, as well as new types as they become available. Additionally, the architecture 110 may be readily configured to accommodate new or different resources 108.

The server computers 112 are configured as general computing devices having processing units, one or more types of memory (e.g., RAM, ROM, disk, RAID storage, etc.), input and output devices, and a busing architecture to interconnect the components. As one possible implementation, the servers 112 may be interconnected via other internal networks to form clusters or a server farm, wherein different sets of servers support different layers or modules of the architecture 110. The servers may or may not reside within a similar location, with the software being distributed across the various machines. Various layers of the architecture 110 may be executed on one or more servers. As an alternative implementation, the architecture 110 may be implemented on single computer, such as a mainframe computer or a powerful server computer, rather than the multiple servers as illustrated.

The resources 108 are representative of any number of different types of resources. Examples of resources include databases, websites, legacy financial systems, electronic trading networks, auction sites, and so forth. The resources 108 may reside with the server system 106, or be located remotely. Access to the resources may be supported by any number of different technologies, networks, protocols, and the like.

General Architecture

Figure 2:
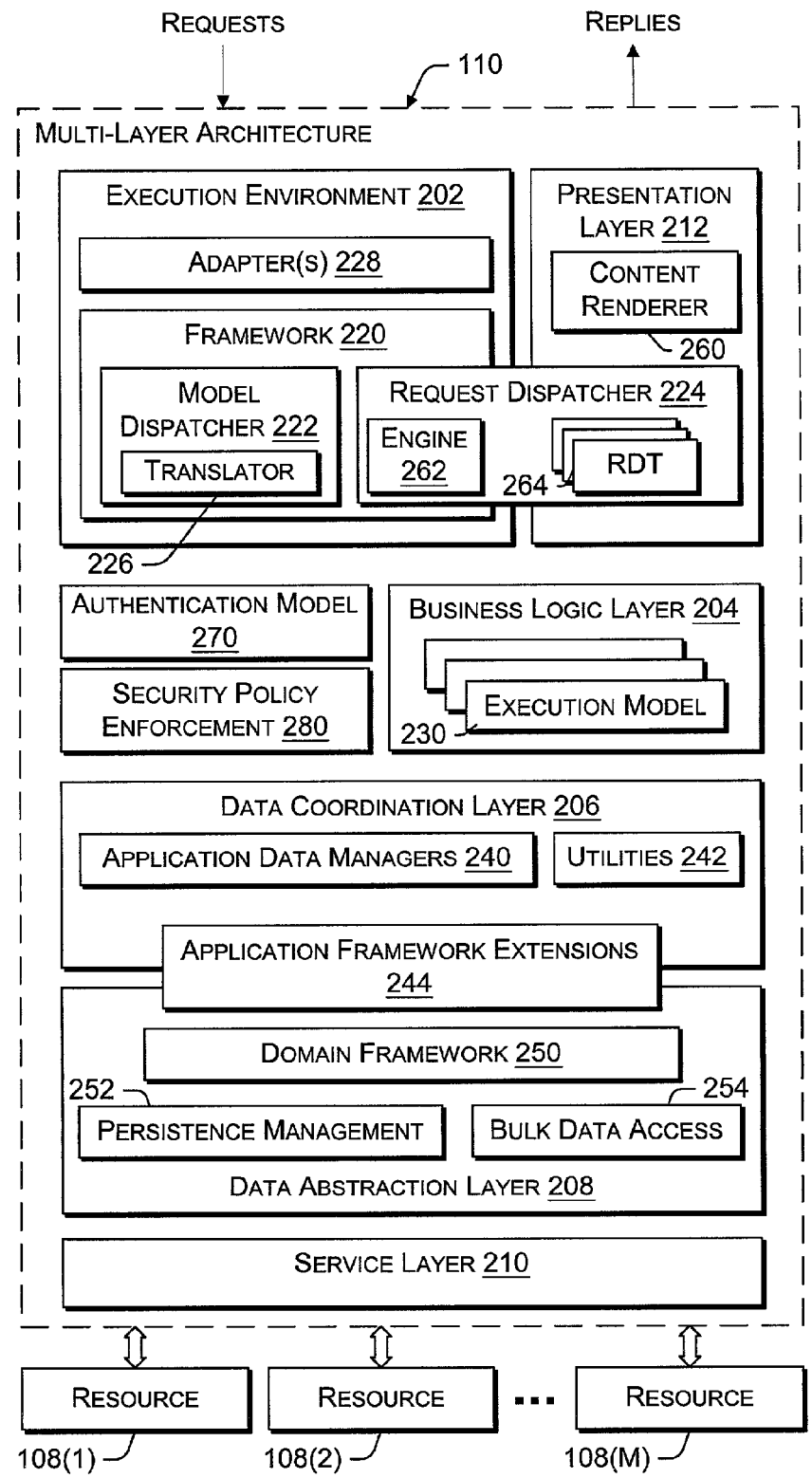
FIG. 2 is a block diagram of the application architecture.

FIG. 2 illustrates one exemplary implementation of the multi-layer architecture 110 that is configured as a server application for a business-oriented domain. The architecture is logically partitioned into multiple layers to promote flexibility in adapting the architecture to different problem domains. Generally, the architecture 110 includes an execution environment layer 202, a business logic layer 204, a data coordination layer 206, a data abstraction layer 208, a service layer 210, and a presentation layer 212. The layers are illustrated vertically to convey an understanding as to how requests are received and handled by the various layers.

Client requests are received at the execution environment 202 and passed to the business logic layer 204 for processing according to the specific business application. As the business logic layer 204 desires information to fulfill the requests, the data coordination layer 206, data abstraction layer 208, and service layer 210 facilitate extraction of the information from the external resources 108. When a reply is completed, it is passed to the execution environment 202 and presentation layer 212 for serving back to the requesting client.

The architecture 110 can be readily modified to (1) implement different applications for different domains by plugging in the appropriate business logic in the business logic layer 204, (2) support different client devices by configuring suitable modules in the execution environment 202 and presentation layer 212, and (3) extract information from diverse resources by inserting the appropriate modules in the data abstraction layer 208 and service layer 210. The partitioned nature of the architecture allows these modifications to be made independently of one another. As a result, the architecture 110 can be adapted to many different domains by interchanging one or more modules in selected layers without having to reconstruct entire application solutions for those different domains.

The execution environment 202 contains an execution infrastructure to handle requests from clients. In one sense, the execution environment acts as a container into which the business logic layer 204 may be inserted. The execution environment 202 provides the interfacing between the client devices and the business logic layer 204 so that the business logic layer 204 need not understand how to communicate directly with the client devices.

The execution environment 202 includes a framework 220 that receives the client requests and routes the requests to the appropriate business logic for processing. After the business logic generates replies, the framework 220 interacts with the presentation layer 212 to prepare the replies for return to the clients in a format and protocol suitable for presentation on the clients.

The framework 220 is composed of a model dispatcher 222 and a request dispatcher 224. The model dispatcher 222 routes client requests to the appropriate business logic in the business logic layer 204. It may include a translator 226 to translate the requests into an appropriate form to be processed by the business logic. For instance, the translator 226 may extract data or other information from the requests and pass in this raw data to the business logic layer 204 for processing. The request dispatcher 224 formulates the replies in a way that can be sent and presented at the client. Notice that the request dispatcher is illustrated as bridging the execution environment 202 and the presentation layer 212 to convey the understanding that, in the described implementation, the execution environment and the presentation layer share in the tasks of structuring replies for return and presentation at the clients.

One or more adapters 228 may be included in the execution environment layer 202 to interface the framework 220 with various client types. As an example, one adapter may be provided to receive requests from a communications device using WAP, while another adapter may be configured to receive requests from a client browser using HTTP, while a third adapter is configured to receive requests from a messaging service using a messaging protocol.

The business logic layer 204 contains the business logic of an application that processes client requests. Generally speaking, the business logic layer contains problem-solving logic that produces solutions for a particular problem domain. In this example, the problem domain is a commerce-oriented problem domain (e.g., asset lending, asset management, insurance, etc.), although the architecture 110 can be implemented in non-business contexts. The logic in the logic layer is therefore application-specific and hence, is written on a per-application basis for a given domain.

In the illustrated implementation, the business logic in the business logic layer 204 is constructed as one or more execution models 230 that define how computer programs process the client requests received by the application. The execution models 230 may be constructed in a variety of ways. One exemplary execution model employs an interaction-based definition in which computer programs are individually defined by a series of one or more interaction definitions based on a request-response model. Each interaction definition includes one or more command definitions and view definitions. A command definition defines a command whose functionality may be represented by an object that has various attributes and that provides the behavior for that command. A view definition defines a view that provides a response to a request.

One example of an interaction-based model is a command bean model that employs multiple discrete program modules, called "Command Beans", that are called for and executed. The command bean model is based on the "Java Bean" from Sun Microsystems, which utilizes discrete Java™ program modules. One particular execution model 230 that implements an exemplary program is described below beneath the heading "Business Logic Layer" with reference to FIGS. 4-6.

Other examples of an execution model include an action-view model and a use case model. The action-view model employs action handlers that execute code and provide a rendering to be served back to the client. The use case model maps requests to predefined UML (Unified Modeling Language) cases for processing.

The data coordination layer 206 provides an interface for the business logic layer 204 to communicate with a specific domain framework 250 implemented in the data abstraction layer 208 for a specific problem domain. In one implementation, the framework 250 utilizes a domain object model to model information flow for the problem domain. The data coordination layer 206 effectively partitions the business logic layer 204 from detailed knowledge of the domain object model as well as any understanding regarding how to obtain data from the external resources.

The data coordination layer 206 includes a set of one or more application data managers 240, utilities 242, and framework extensions 244. The application data managers 240 interface the particular domain object model in the data abstraction layer 208 into a particular application solution space of the business logic layer 204. Due to the partitioning, the execution models 230 in the business logic layer 204 are able to make calls to the application data managers 240 for specific information, without having any knowledge of the underlying domain or resources. The application data managers 240 obtain the information from the data abstraction layer 208 and return it to the execution models 230. The utilities 242 are a group of reusable, generic, and low-level code modules that developers may utilize to implement the interfaces or provide rudimentary tools for the application data managers 240.

The data abstraction layer 208 maps the domain object model to the various external resources 108. The data abstraction layer 208 contains the domain framework 250 for mapping the business logic to a specific problem domain, thereby partitioning the business applications and application managers from the underlying domain. In this manner, the domain framework 250 imposes no application-specific semantics, since it is abstracted from the application model. The domain framework 250 also does not dictate any functionality of services, as it can load any type of functionality (e.g., Java™ classes, databases, etc.) and be used to interface with third-party resources.

Extensions 244 to the domain framework 250 can be constructed to help interface the domain framework 250 to the application data managers 240. The extensions can be standardized for use across multiple different applications, and collected into a library. As such, the extensions may be pluggable and removable as desired. The extensions 244 may reside in either or both the data coordination layer 206 and the data abstraction layer 208, as represented by the block 244 straddling both layers.

The data abstraction layer 208 further includes a persistence management module 252 to manage data persistence in cooperation with the underlying data storage resources, and a bulk data access module 254 to facilitate access to data storage resources. Due to the partitioned nature of the architecture 110, the data abstraction layer 208 isolates the business logic layer 204 and the data coordination layer 206 from the underlying resources 108, allowing such mechanisms from the persistence management module 252 to be plugged into the architecture as desired to support a certain type of resource without alteration to the execution models 230 or application data managers 240.

A service layer 210 interfaces the data abstraction layer 208 and the resources 108. The service layer 210 contains service software modules for facilitating communication with specific underlying resources. Examples of service software modules include a logging service, a configuration service, a serialization service, a database service, and the like.

The presentation layer 212 contains the software elements that package and deliver the replies to the clients. It handles such tasks as choosing the content for a reply, selecting a data format, and determining a communication protocol. The presentation layer 212 also addresses the "look and feel" of the application by tailoring replies according to a brand and user-choice perspective. The presentation layer 212 is partitioned from the business logic layer 204 of the application. By separating presentation aspects from request processing, the architecture 110 enables the application to selectively render output based on the types of receiving devices without having to modify the logic source code at the business logic layer 204 for each new device. This allows a single application to provide output for many different receiving devices (e.g., web browsers, WAP devices, PDAs, etc.) and to adapt quickly to new devices that may be added in the future.

In this implementation, the presentation layer 212 is divided into two tiers: a presentation tier and a content rendering tier. The request dispatcher 224 implements the presentation tier. It selects an appropriate data type, encoding format, and protocol in which to output the content so that it can be carried over a network and rendered on the client. The request dispatcher 224 is composed of an engine 262, which resides at the framework 220 in the illustrated implementation, and multiple request dispatcher types (RDTs) 264 that accommodate many different data types, encoding formats, and protocols of the clients. Based on the client device, the engine 262 makes various decisions relating to presentation of content on the device. For example, the engine might select an appropriate data encoding format (e.g. HTML, XML, EDI, WML, etc.) for a particular client and an appropriate communication protocol (e.g. HTTP, Java™ RMI, CORBA, TCP/IP, etc.) to communicate the response to the client. The engine 262 might further decide how to construct the reply for visual appearance, such as selecting a particular layout, branding, skin, color scheme, or other customization based on the properties of the application or user preference. Based on these decisions, the engine 262 chooses one or more dispatcher types 264 to structure the reply.

A content renderer 260 forms the content rendering tier of the presentation layer 212. The renderer 260 performs any work related to outputting the content to the user. For example, it may construct the output display to accommodate an actual width of the user's display, elect to display text rather than graphics, choose a particular font, adjust the font size, determine whether the content is printable or how it should be printed, elect to present audio content rather than video content, and so on.

With the presentation layer 212 partitioned from the execution environment 202, the architecture 110 supports receiving requests in one format type and returning replies in another format type. For example, a user on a browser-based client (e.g., desktop or laptop computer) may submit a request via HTTP and the reply to that request may be returned to that user's PDA or wireless communications device using WAP. Additionally, by partitioning the presentation layer 212 from the business logic layer 204, the presentation functionality can be modified independently of the business logic to provide new or different ways to serve the content according to user preferences and client device capabilities.

The architecture 110 may include one or more other layers or modules. One example is an authentication model 270 that performs the tasks of authenticating clients and/or users prior to processing any requests. Another example is a security policy enforcement module 280 that supports the security of the application. The security enforcement module 280 can be implemented as one or more independent modules that plug into the application framework to enforce essentially any type of security rules. New application security rules can be implemented by simply plugging in a new system enforcement module 280 without modifying other layers of the architecture 110.

General Operation

Figure 3:
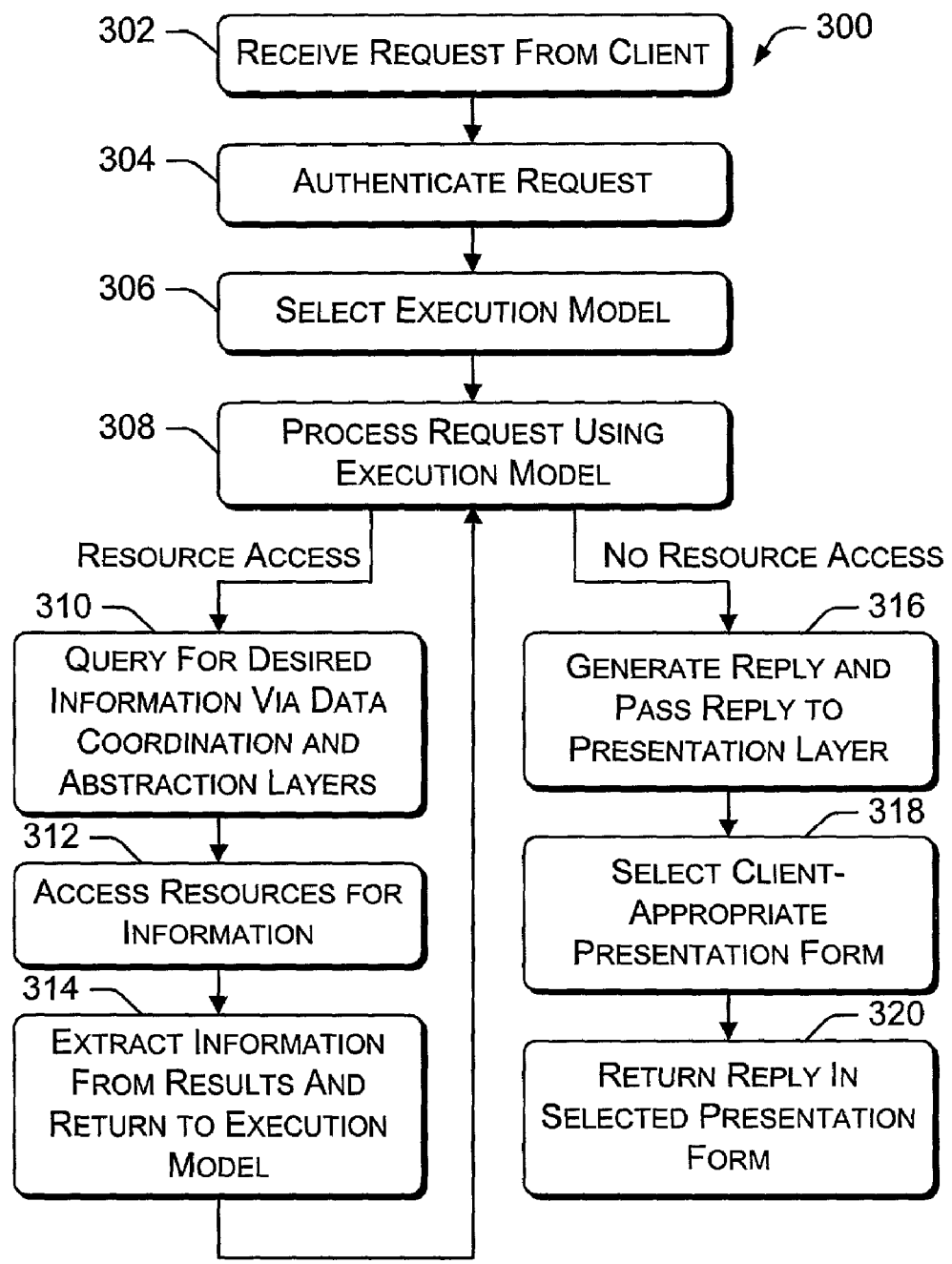
FIG. 3 is a flow diagram illustrating a general operation of the application architecture when handling client requests.

FIG. 3 shows an exemplary operation 300 of a business domain application constructed using the architecture 110 of FIGS. 1 and 2. The operation 300 is implemented as a software process of acts performed by execution of software instructions. Accordingly, the blocks illustrated in FIG. 3 represent computer-readable instructions, that when executed at the server system 106, perform the acts stipulated in the blocks.

To aid the discussion, the operation will be described in the context of asset management, wherein the architecture 110 is configured as a server application executing on the application server system 106 for an asset management domain. Additionally, for discussion purposes, suppose a user is equipped with a portable wireless communications device (e.g., a cellular phone) having a small screen with limited display capabilities and utilizing WAP to send/receive messages over a wireless cellular network. The user submits a request for information on a particular asset, such as the specification of a turbine engine or the availability of an electric pump, from the wireless communications device.

At block 302, requests from various clients are received at the execution environment layer 202. Depending on the client type, one or more adapters 228 may be involved to receive the requests and convert them to a form used internally by the application 110. In our example, the execution environment layer 202 receives the request from the wireless cellular network. An adapter 228 may be utilized to unwrap the request from its WAP-based packet for internal processing.

At block 304, the execution framework 202 may pass the request, or data extracted from the request, to the authentication model 270 for authentication of the client and/or user. If the requestor is not valid, the request is denied and a service denied message (or other type of message) is returned to the client. Assuming the request is valid, the authentication model 270 returns its approval.

At block 306, the model dispatcher 222 routes the request to one or more execution models 230 in the business logic layer 204 to process the client request. In our example, the model dispatcher 222 might select an execution model 230 to retrieve information on the particular asset. A translator 226 may be invoked to assist in conforming the request to a form that is acceptable to the selected execution model.

At block 308, the execution model 230 begins processing the request. Suppose, for example, that the selected execution model is implemented as a command bean model in which individual code sequences, or "command beans", perform discrete tasks. One discrete task might be to initiate a database transaction, while another discrete task might be to load information pertaining to an item in the database, and a third discrete task might be to end the transaction and return the results.

The execution model 230 may or may not need to access information maintained at an external resource. For simple requests, such as an initial logon page, the execution model 230 can prepare a reply without querying the resources 108. This is represented by the "No Resource Access" branch in FIG. 3. For other requests, such as the example request for data on a particular asset, the execution model may utilize information stored at an external resource in its preparation of a reply. This is illustrated by the "Resource Access" branch.

When the execution model 230 reaches a point where it wishes to obtain information from an external resource (e.g., getting asset specific information from a database), the execution model calls an application data manager 240 in the data coordination layer 206 to query the desired information (i.e., block 310). The application data manager 240 communicates with the domain framework 250 in the data abstraction layer 208, which in turn maps the query to the appropriate resource and facilitates access to that resource via the service layer 210 (i.e., block 312). In our example, the domain framework is configured with an asset management domain object model that controls information flow to external resources—storage systems, inventory systems, etc.—that maintain asset information.

At block 314, results are returned from the resource and translated at the domain framework 250 back into a raw form that can be processed by the execution model 230. Continuing the asset management example, a database resource may return specification or availability data pertaining to the particular asset. This data may initially be in a format used by the database resource. The domain framework 250 extracts the raw data from the database-formatted results and passes that data back through the application data managers 240 to the execution model 230. In this manner, the execution model 230 need not understand how to communicate with the various types of resources directly, nor understand the formats employed by various resources.

At block 316, the execution model completes execution using the returned data to produce a reply to the client request. In our example, the command bean model generates a reply containing the specification or availability details pertaining to the requested asset. The execution model 230 passes the reply to the presentation layer 212 to be structured in a form that is suitable for the requesting client.

At block 318, the presentation layer 212 selects an appropriate format, data type, protocol, and so forth based on the capabilities of the client device, as well as user preferences. In the asset management example, the client device is a small wireless communication device that accepts WAP-based messages. Accordingly, the presentation layer 212 prepares a text reply that can be conveniently displayed on the small display and packages that reply in a format supported by WAP. At block 320, the presentation layer 212 transmits the reply back to the requesting client using the wireless network.

Business Logic Layer

The business logic layer 204 contains one or more execution models that define how computer programs process client requests received by the application. One exemplary execution model employs an interaction-based definition in which computer programs are individually defined by a series of one or more interaction definitions based on a request-response model. Each interaction definition includes command definitions and view definitions. A command definition defines a command whose functionality may be represented by an object that has various attributes and that provides the behavior for that command. A view definition defines a view that provides a response to a request.

Each interaction of a computer program is associated with a certain type of request. When a request is received from the model dispatcher 222, the associated interaction is identified to perform the behavior of the commands defined by that interaction. The execution model automatically instantiates an object associated with each command defined in a command definition. Prior to performing the behavior of a command, the execution model prepares the instantiated object by identifying one or more input attributes of that object (e.g., by retrieving the class definition of the object) and setting the input attributes (e.g., by invoking set methods) of the object based on the current value of the attributes in an attribute store.

After setting the attribute values, the execution model performs the behavior of the object (e.g., by invoking a perform method of the object). After the behavior is performed, the execution model extracts the output attributes of the object by retrieving the values of the output attributes (e.g., by invoking get methods of the object) and storing those values in the attribute store. Thus, the attribute store stores the output attributes of each object that are then available to set the input attributes of other objects.

The execution model may serially perform the instantiation, preparation, performance, and extraction for each command. Alternatively, the execution of commands can be performed in parallel depending on the data dependencies of the commands. Because the execution model automatically prepares an object based on the current values in the attribute store and extracts attribute values after performing the behavior of the object, a programmer does not need to explicitly specify the invocation of methods of objects (e.g., "object.setAttribute1=15") when developing a computer program to be executed by the execution model.

Figure 4:
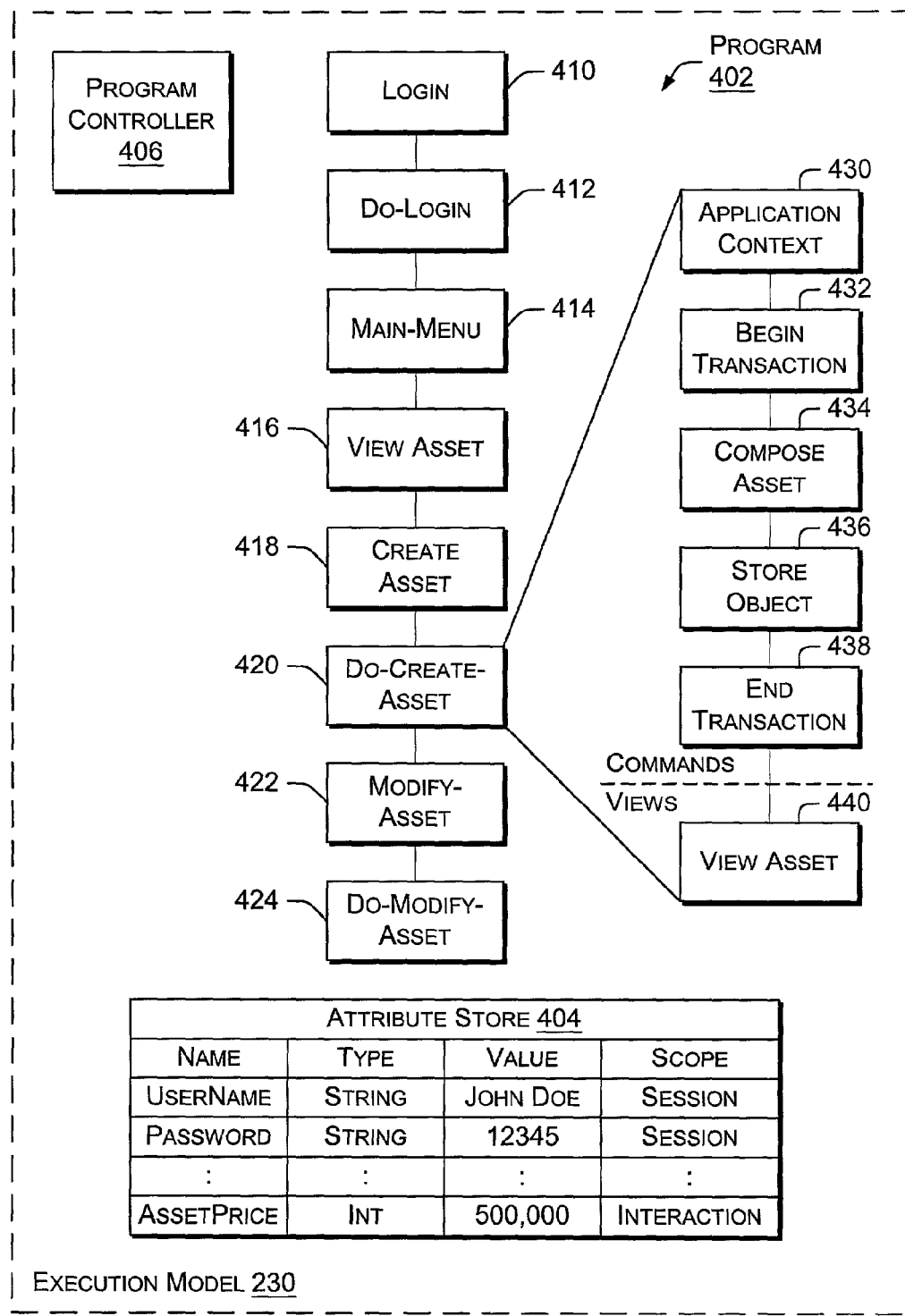
FIG. 4 is a block diagram of an exemplary execution model configured as an asset catalog program and a controller to execute various interactions of the asset catalog program.

FIG. 4 shows an exemplary execution model 230 configured for an asset catalog application that allows a user to view, create, and modify information relating to assets (e.g., products) stored in an electronic catalog. The model 230 includes an asset catalog program 402, an attribute store 404, and a program controller 406. The asset catalog program 402 includes eight interactions: login 410, do-login 412, main-menu 414, view-asset 416, create-asset 418, do-create-asset 420, modify-asset 422, and do-modify-asset 424. The controller 406 executes the program 402 to perform the various interactions. One exemplary implementation of the controller is described below in more detail with reference to FIG. 6.

Upon receiving a request, the controller 406 invokes the corresponding interaction of the program 402 to perform the behavior and return a view so that subsequent requests of the program can be made. The do-create-asset interaction 420, for example, is invoked after a user specifies the values of the attributes of a new asset to be added to the asset catalog. Each interaction is defined by a series of one or more command definitions and a view definition. Each command definition defines a command (e.g., object class) that provides a certain behavior. For instance, the do-create-asset interaction 420 includes five command definitions—application context 430, begin transaction 432, compose asset 434, store object 436, and end transaction 438—and a view definition named view asset 440.

When the do-create-asset interaction 420 is invoked, the application context command 430 retrieves the current application context of the application. The application context may be used by the interaction to access certain application-wide information. The begin transaction command 432 indicates that a transaction for the asset catalog is beginning. The compose asset command 434 creates an object that identifies the value of the attributes of the asset to be added to the asset catalog. The store object command 436 stores an entry identified by the created object in the asset catalog. The end transaction command 438 indicates that the transaction to the asset catalog has ended. The view asset view 440 prepares a response (e.g., display page) to return to the user.

The attribute store 404 contains an entry for each attribute that has been defined by any interaction of the application that has been invoked. The attribute store identifies a name of the attribute, a type of the attribute, a scope of the attribute, and a current value of the attribute. For example, the last entry in the attribute store 404 has the name of "assetPrice", with a type of "integer", a value of "500,000", and a scope of "interaction". The scope of an attribute indicates the attribute's life. An attribute with the scope of "interaction" (also known as "request") has a life only within the interaction in which it is defined. An attribute with the scope of "session" has a life only within the current session (e.g., logon session) of the application. An attribute with the scope of "application" has life throughout the duration of an application.

When the program controller 406 receives a request to create an asset (e.g., a do-create-asset request), the controller invokes the do-create-asset interaction 420. The controller first instantiates an application context object defined in the interaction command 430 and prepares the object by setting its attributes based on the current values of the attribute store 404. The controller then performs the behavior of the object by invoking a perform method of the object and extracts the attribute values of the object by getting the attribute values and storing them in the attribute store 404.

Next, the program controller 406 instantiates a begin transaction object defined by the interaction command 432 and prepares the object by setting its attribute values based on the current values of the attribute store 404. It then performs the behavior of the object by invoking a perform method of the object and extracts the attribute values of the object by getting the attribute values and storing them in the attribute store. The controller 406 repeats this process for a compose-asset object instantiated according to command 434, the store-object object instantiated according to command 436, and the end transaction object instantiated according to command 438. The controller 406 then invokes the view asset 440 to retrieve the values of the attributes of the asset from the attribute store 404 for purposes of presenting those attribute values back to the client.

Figure 5:
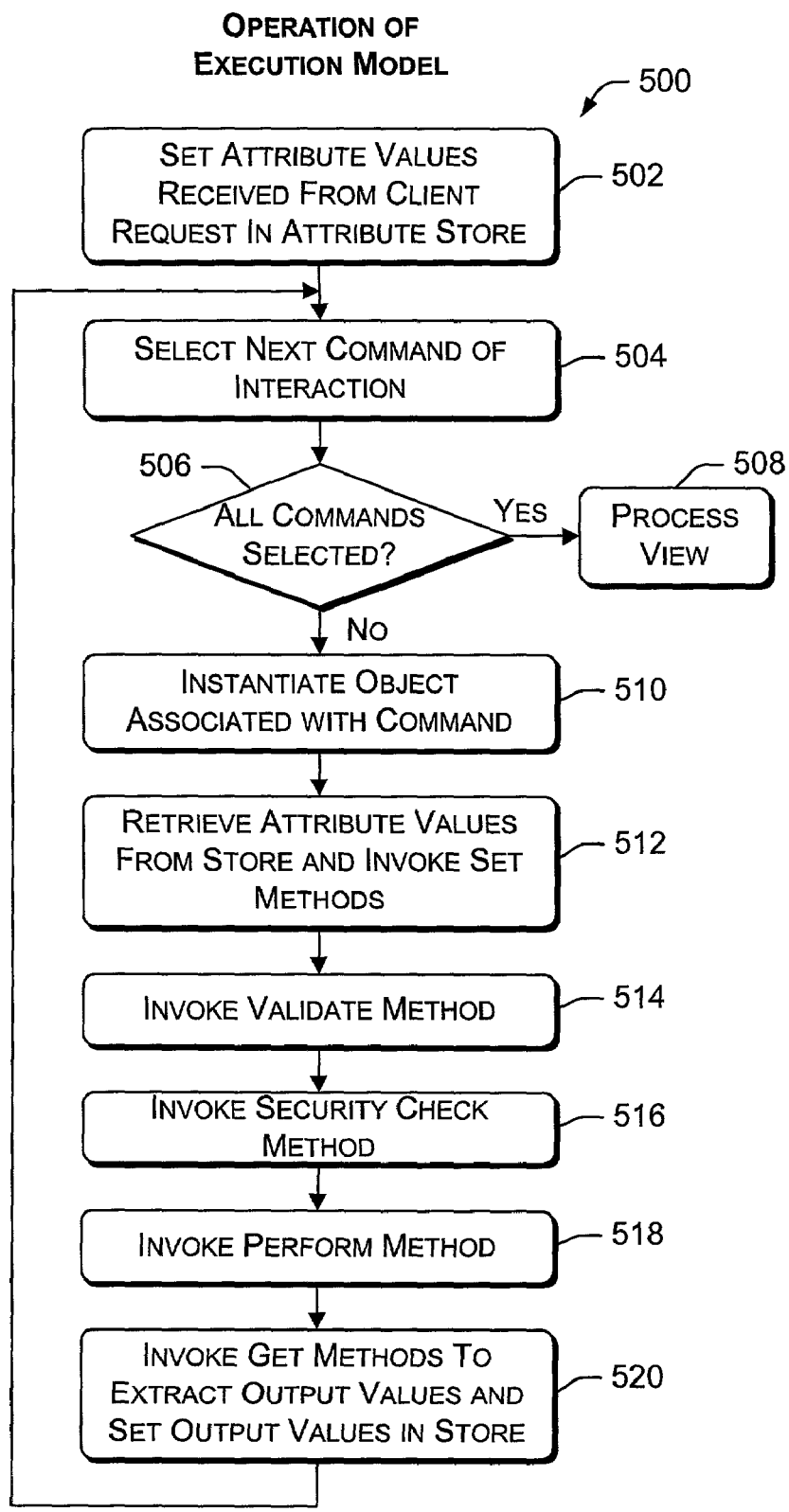
FIG. 5 is a flow diagram of a process for executing the asset catalog program.

FIG. 5 shows a process 500 implemented by the program controller 406 of the execution model 230 when executing an interaction-based program, such as program 402. The process 500 is implemented in software and hence, the illustrated blocks represent computer-readable instructions, that when executed at the server system 106, perform the stated acts.

At block 502, the controller 406 sets the attribute values from the request in the attribute store 404. For example, a view-asset request may include a value for an "assetID" attribute that uniquely identifies an asset currently stored in the asset catalog. The controller then loops through each command of the interaction associated with the request. At block 504, the controller selects the next command of the interaction associated with the request, starting with the first command. If all commands have already been selected (i.e., the "yes" branch from block 506), the controller 406 processes the view defined in the view definition of the interaction and returns the response to the presentation layer 212 (i.e., block 508).

On the other hand, if not all of the commands have been selected (i.e., the "no" branch from block 506), the controller instantiates an object associated with the selected command (i.e., block 510). The object class associated with the command is specified in the command definition of the interaction. In block 512, the controller 406 prepares the object by retrieving the values of the input attributes of the object from the attribute store 404 and invoking the set methods of the object to set the values of the attributes. At block 514, the controller invokes a validate method of the object to determine whether the current values of the input attributes of the object will allow the behavior of the object to be performed correctly. If the validate method indicates that the behavior cannot be performed, the controller generates an exception and skips further processing of the commands of the interaction.

At block 516, the controller optionally invokes a security check method of the object to determine whether the user that initiated the request is able to perform the action with the object that is indicated by the interaction. The security check method invokes the security policy enforcement 280 of FIG. 2 to perform the security check. The result of the security check is then returned to the security check method of the object, which returns the result to the controller 406.

At block 518, the controller invokes the perform method of the object to perform the behavior of the object. At block 520, the controller extracts the values of the output attribute of the object by invoking the get methods of the object and setting the values of the corresponding attributes in the attribute store 404. The controller then loops to block 504 to select the next command of the interaction.

Figure 6:
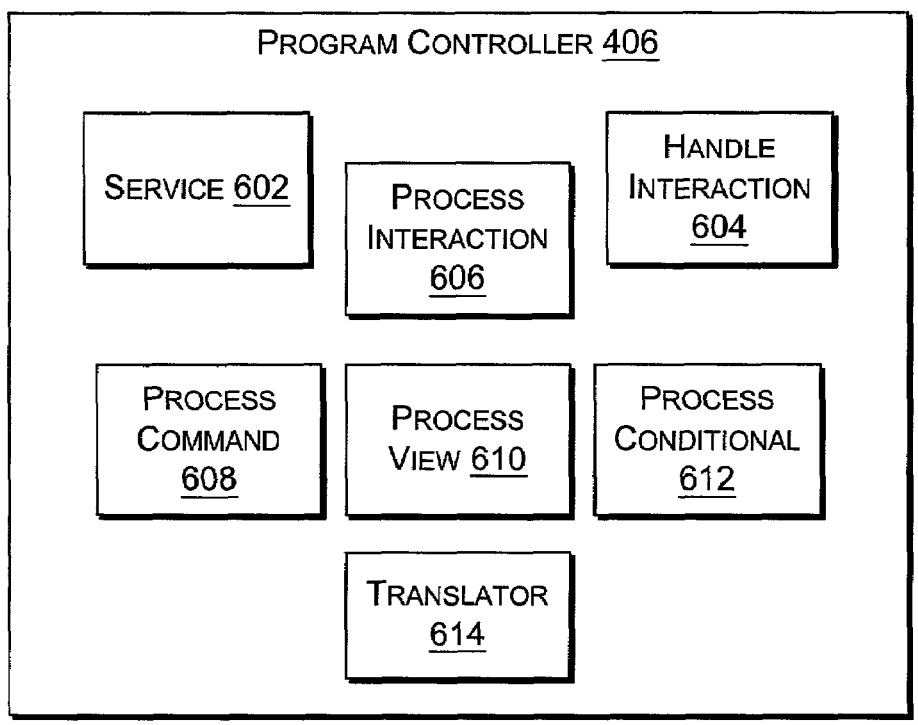
FIG. 6 is a block diagram of the program controller used in the execution model of FIG. 4.

FIG. 6 shows one exemplary implementation of the controller 406 in more detail. It includes multiple components that are configured according to the request-response model where individual components receive a request and return a response. The controller 406 includes a service component 602 that is invoked to service a request message. The service component 602 stores the value of any attributes specified in the request in the attribute store 404. For example, the component may set the current value of a URL attribute as indicated by the request. Once the attribute values are stored, the service component 602 invokes a handle interaction component 604 and passes on the request. It is noted that the service component will eventually receive a response in return from the handle interaction component 604, which will then be passed back to the presentation layer 212 for construction of a reply to be returned to the client.

The handle interaction component 604 retrieves, from the program database, the interaction definition for the interaction specified in the request. The handle interaction component 604 then invokes a process interaction component 606 and passes the request, response, and the interaction definition.

The process interaction component 606 processes each command and view of the interaction and returns a response. For a given descriptor (i.e., command, view, or conditional) specified in the interaction, the process interaction component identifies the descriptor and invokes an appropriate component for processing. If the descriptor is a command, the process interaction component 606 invokes a process command component 608 to process the command of interaction. If the descriptor is a view, the process interaction component 606 invokes a process view component 610 to process the view of the interaction. If the descriptor is a conditional, the process interaction component 606 invokes a process conditional component 612 to process the conditional of the interaction.

When processing a command, the process command component 608 instantiates the object (e.g., as a "Java bean" in the Java™ environment) for the command and initializes the instantiated object by invoking an initialization method of the object. The process command component invokes a translator component 614 and passes the instantiated object to prepare the object for performing its behavior. A translator component is an object that provides a prepare method and an extract method for processing an object instantiated by the process command component to perform the command. Each command may specify the translator that is to be used for that command. If the command does not specify a translator, a default translator is used.

The translator component 614 sets the attribute values of the passed object based on the current attribute values in the attribute store 404. The translator component 614 identifies any set methods of the object based on a class definition of the object. The class definition may be retrieved from a class database or using a method provided by the object itself.

When a set method is identified, the translator component identifies a value of the attribute associated with a set method of the object. The attribute store is checked to determine whether a current value for the attribute of the set method is defined. If the current value of the attribute is defined in the attribute store, the attribute value is retrieved from the attribute store, giving priority to the command definition and then to increasing scope (i.e., interaction, session, and then application). The component performs any necessary translation of the attribute value, such as converting an integer representation of the number to a string representation, and passes back the translated value. When all methods have been examined, the translator component 614 returns control to the process command component 608.

The process command component 608 may also validate the object. If valid, the component performs the behavior of the object by invoking the perform method of the object. The component once again invokes the translator and passes the object to extract the attribute values of the object and store the current attribute values in the attribute store 404.

When processing a view, the process view component 610 either invokes a target (e.g., JSP, ASP, etc.) or invokes the behavior of an object that it instantiates. If a class name is not specified in the definition of the view, the process view component 610 retrieves a target specified in the view definition and dispatches a view request to the retrieved target. Otherwise, if a class name is specified, the process view component 610 performs the behavior of an object that it instantiates. The process view component 610 retrieves a translator for the view and instantiates an object of the type specified in the view definition. The process view component 610 initializes the object and invokes the translator to prepare the object by setting the values of the attributes of the object based on the attribute store. The process view component 610 validates the object and performs the behavior of the object. The process view component 610 then returns.

When processing a conditional, the process conditional component 612 interprets a condition to identify the descriptors that should be processed. The component may interpret the condition based on the current values of the attributes in the attribute store. Then, the process conditional component 612 recursively invokes the process interaction component 606 to process the descriptors (command, view, or conditional) associated with the condition. The process conditional component 612 then returns.

One exemplary form of a program implemented as a document type definition (DTD) is illustrated in Table 1. The interactions defining the program are specified in an XML ("extensible Markup Language") file.

TABLE 1

```
1.    <!ELEMENT program (translator*,command*,view*,interaction*)>
2.    <!ATTLIST program
3.      name    ID    #REQUIRED
4.    >
5.
6.    <!ELEMENT translator EMPTY>
7.    <!ATTLIST translator
8.      name    ID    #REQUIRED
9.      class   CDATA #REQUIRED
10.     default (true|false) "false"
11.   >
12.
13.   <!ELEMENT translator-ref EMPTY>
14.   <!ATTLIST translator-ref
15.     name    IDREF #REQUIRED
16.   >
17.
18.   <!ELEMENT command (translator-ref*, attribute*)>
19.   <!ATTLIST command
20.     name    ID    #REQUIRED
21.     class   CDATA #REQUIRED
22.   >
23.
24.   <!ELEMENT command-ref (attribute*)>
25.   <!ATTLIST command-ref
26.     name    IDREF #REQUIRED
27.     type    (default|finally) "default"
28.   >
29.
30.   <!ELEMENT attribute EMPTY>
31.   <!ATTLIST attribute
32.     name    ID    #REQUIRED
33.     value   CDATA #IMPLIED
34.     get-name  CDATA #IMPLIED
35.     set-name  CDATA #IMPLIED
36.     scope   (application|request|session) "request"
37.   >
38.
39.   <!ELEMENT view>
40.   <!ATTLIST view
41.     name    ID #REQUIRED
42.     target  CDATA #REQUIRED
43.     type    (default|error) "default"
44.     default (true|false) "false"
45.   >
46.
47.   <!ELEMENT view-ref>
```

TABLE 1-continued

```
48.    <!ATTLIST view-ref
49.      name    IDREF #REQUIRED
50.    >
51.
52.    <!ELEMENT if (#PCDATA)>
53.    <!ELEMENT elsif (#PCDATA)>
54.    <!ELEMENT else EMPTY>
55.    <!ELEMENT conditional (if?, elsif*, else*, command-ref*, view-ref*, conditional*)>
56.
57.    !ELEMENT interaction (command-ref*,view-ref*,conditional*)>
58.    <!ATTLIST interaction
59.      name    ID #REQUIRED
60.    >
```

Lines 1-4 define a program tag, which is the root tag of the XML file. The program tag can include translator, command, view, and interaction tags. The program tag includes a name attribute that specifies the name of the program. Lines 6-11 define a translator tag of the translator, such as translator 614. The name attribute of the translator tag is a logical name used by a command tag to specify the translator for that command. The class attribute of the translator tag identifies the class for the translator object. The default attribute of the translator tag indicates whether this translator is the default translator that is used when a command does not specify a translator.

Lines 13-16 define a translator-ref tag that is used in a command tag to refer back to the translator to be used with the command. The name attribute of the translator-ref tag identifies the name of the translator to be used by the command. Lines 18-22 define a command tag, which may include translator-ref tags and attribute tags. The translator-ref tags specify names of the translators to be used by this command and the attribute tags specify information relating to attributes of the command. The name attribute of the command tag provides the name of the command. The class attribute of the command tag provides the name of the object class that provides the behavior of the command.

Lines 24-28 define a command-ref tag that is used by an interaction tag (defined below) to specify the commands within the interaction. The command reference tag may include attribute tags. The name attribute of the command-ref tag specifies the logical name of the command as specified in a command tag. The type attribute of the command-ref tag specifies whether the command should be performed even if an exception occurs earlier in the interaction. The value of "finally." means that the command should be performed.

Lines 30-37 define an attribute tag, which stipulates how attributes of the command are processed. The name attribute of the attribute tag specifies the name of an attribute. The value attribute of the attribute tag specifies a value for the attribute. That value is to be used when the command is invoked to override the current value for that attribute in the attribute store. The get-name attribute of the attribute tag specifies an alternate name for the attribute when getting an attribute value. The set-name attribute of the attribute tag specifies an alternate name for the attribute when setting an attribute value. The scope attribute of the attribute tag specifies whether the scope of the attribute is application, request (or interaction), or session.

Lines 39-45 define a view tag that stipulates a view. The name attribute of the view tag specifies the name of the view. The target attribute of a view tag specifies the JSP target of a view. The type attribute of the view tag specifies whether the view should be invoked when there is an error. The default attribute of the view tag specifies whether this view is the default view that is used when an interaction does not explicitly specify a view.

Lines 47-50 define a view-ref tag, which is included in interaction tags to specify that the associated view is to be included in the interaction. The name attribute of the view-ref tag specifies the name of the referenced view as indicated in a view tag. Lines 52-55 define tags used for conditional analysis of commands or views. A conditional tag may include an "if" tag, an "else if" tag, an "else" tag, a command-ref tag, a view-ref tag, and a conditional tag. The data of the "if" tag and the "else if" tag specify a condition (e.g., based on attribute values in the attribute store) that defines the commands or view that are to be conditionally performed when executing interaction.

Lines 57-60 define an interaction tag, which defines a sequence of command, view, or conditional tags of an interaction. The interaction tag may include command-ref, view-ref and conditional tags. The name attribute of the interaction tag identifies the name of the interaction. The requests passed into the execution model specify the name of the interaction to execute.

Table 2 provides an example XML file for the asset catalog program 402 illustrated in FIG. 4 and described above. Line 1 includes a program tag with the name of the program "asset catalog". Lines 2-3 specify the default translator for the program. Lines 5-11 define the various commands associated with the program. For example, as indicated by line 7, the command named "login" is associated with the class "demo.cb.Login." Whenever a login command is performed, an object of class "demo.cb.Login" is used to provide the behavior.

Lines 13-20 define the views of the program. For example, line 14 illustrates that the view named "view-asset" (i.e., view 440 in FIG. 4) is invoked by invoking the target named "html/view-asset.jsp." Lines 23-119 define the various interactions that compose the program. For example, lines 42-53 define the view-asset interaction 416 as including command-ref tags for each command defined in the interaction. The conditional tag at lines 47-52 defines a conditional view such that if a login user has administrator permission, the "view-asset-admin" view is invoked; otherwise, the "view-asset" view is invoked. Lines 88-90 illustrate the use of an attribute tag used within a command tag. The attribute tag indicates that the attribute named "object" is an input attribute of the command that corresponds to the attribute named "asset" in the attribute store 404.

TABLE 2

```
1.    <program name="asset catalog">
2.    <translator name="default-trans" class="com.ge.dialect.cb.DefaultTranslator"
3.    default="true"/>
4.
5.    <command name="app-ctx" class="demo.cb.AppCtx"/>
6.    <command name="begin-tx" class="demo.cb.BeginTx "/>
7.    <command name="login" class="demo.cb.Login"/>
8.    <command name="load-asset" class="demo.cb.LoadAsset"/>
9.    <command name="compose-asset" class="demo.cb.ComposeAsset"/>
10.   <command name="store-object" class="demo.cb.StoreObject"/>
11.   <command name="end-tx" class="demo.cb.EndTx"/>
12.
13.   <view name="error-view" target="html/error.jsp" type="error" default="true"/>
14.   <view name="view-asset" target="html/view-asset.jsp"/>
15.   <view name="view-asset-admin" target="html/view-asset-admin.jsp"/>
16.   <view name="create-asset" target="html/create-asset.jsp"/>
17.   <view name="modify-asset" target="html/modify-asset.jsp"/>
18.   <view name="login" target="html/login.jsp"/>
19.   <view name="login-error" target="html/login.jsp" type="error"/>
20.   <view name="main-menu" target="html/main-menu.jsp"/>
21.
22.
23.   <interaction name="login">
24.      <view-ref name="login"/>
25.   </interaction>
26.
27.   <interaction name="do-login">
28.      <command-ref name="app-ctx"/>
29.      <command-ref name="begin-tx"/>
30.      <command-ref name="login">
31.         <attribute name="loginUser" scope="session"/>
32.      <command-ref>
33.      <command-ref name="end-tx" type="finally"/>
34.      <view-ref name="main-menu"/>
35.      <view-ref name="login-error"/>
36.   </interaction>
37.
38.   <interaction name="main-menu">
39.      <view-ref name="main-menu"/>
40.   </interaction>
41.
42.   <interaction name="view-asset">
43.      <command-ref name="app-ctx"/>
44.      <command-ref name="begin-tx"/>
45.      <command-ref name="load-asset"/>
46.      <command-ref name="end-tx" type="finally"/>
47.      <conditional>
48.         <if>(loginUser != void) && loginUser.hasPermission("admin")</if>
49.            <view-ref name="view-asset-admin"/>
50.         <else/>
51.            <view-ref name="view-asset"/>
52.      </conditional>
53.   </interaction>
54.
55.   <interaction name="create-asset">
56.      <view-ref name="create-asset"/>
57.   </interaction>
58.
59.   <interaction name="do-create-asset">
60.      <command-ref name="app-ctx"/>
61.      <command-ref name="begin-tx"/>
62.      <command-ref name="compose-asset"/>
63.      <command-ref name="store-object">
64.         <attribute name="object" get-name="asset"/>
65.      </command-ref>
66.      <command-ref name="end-tx" type="finally"/>
67.      <conditional>
68.         <if>(loginUser != void) && loginUser.hasPermission("admin")</if>
69.            <view-ref name="view-asset-admin"/>
70.         <else/>
71.            <view-ref name="view-asset"/>
72.      </conditional>
73.   </interaction>
74.
75.   <interaction name="modify-asset">
76.      <command-ref name="app-ctx"/>
77.      <command-ref name="begin-tx"/>
78.      <command-ref name="load-asset"/>
79.      <command-ref name="end-tx" type="finally"/>
```

TABLE 2-continued

```
80.        <view-ref name="modify-asset"/>
81.      </interaction>
82.
83.      <interaction name="do-modify-asset">
84.        <command-ref name="app-ctx"/>
85.        <command-ref name="begin-tx"/>
86.        <command-ref name="load-asset"/>
87.        <command-ref name="compose-asset"/>
88.        <command-ref name="store-object">
89.           <attribute name="object" get-name="asset"/>
90.        </command-ref>
91.        <command-ref name="end-tx" type="finally"/>
92.        <conditional>
93.           <if>(loginUser != void) && loginUser.hasPermission("admin")</if>
94.             <view-ref name="view-asset-admin"/>
95.           <else/>
96.             <view-ref name="view-asset"/>
97.        </conditional>
98.      </interaction>
99.
100.
101.     <interaction name="view-error2">
102.       <conditional>
103.         <if>"A".equals("B")</if>
104.           <command-ref name="begin-tx"/>
105.           <command-ref name="load-asset"/>
106.           <command-ref name="end-tx" type="finally"/>
107.         <elsif>"NEVER".equals("EQUAL")</elsif>
108.           <command-ref name="load-asset"/>
109.           <command-ref name="end-tx" type="finally"/>
110.       </conditional>
111.         <view-ref name="view-asset"/>
112.     </interaction>
113.
114.
115.     <interaction name="view-error">
116.       <command-ref name="load-asset"/>
117.       <command-ref name="end-tx" type="finally"/>
118.       <view-ref name="view-asset"/>
119.     </interaction>
120.
121.   </program>
```

Security Enforcement Model

Figure 7:
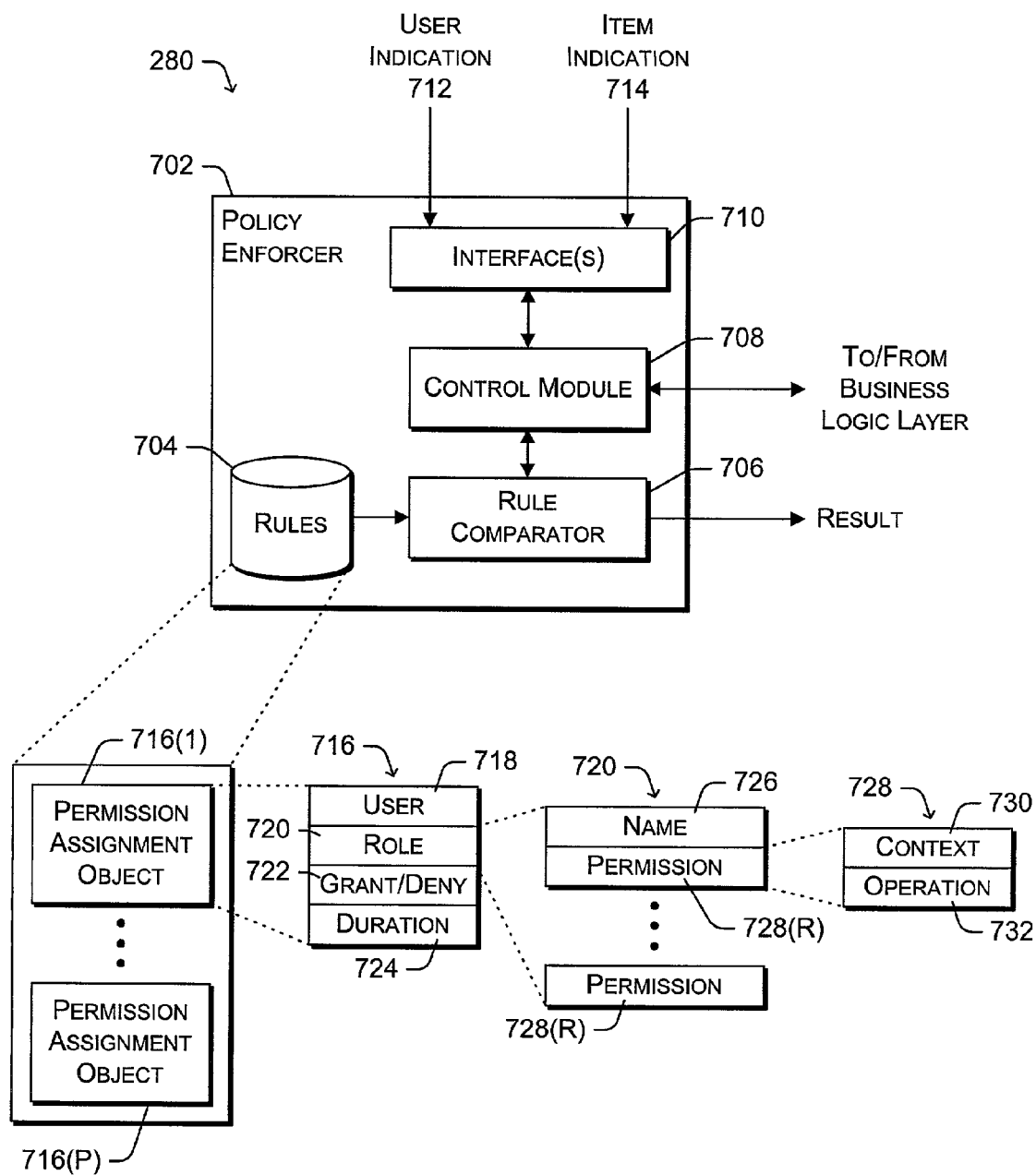
FIG. 7 is a block diagram of a security policy enforcement module.

FIG. 7 illustrates one exemplary implementation of the security policy enforcement 280 of FIG. 2. The security policy enforcement 280 includes a policy enforcer 702 having a set of one or more rules 704, a rule comparator 706, a control module 708, and one or more interfaces 710. The policy enforcer 702 can be implemented in a variety of different manners, such as an object, a set of remotely callable functions or procedures, and so forth.

Generally, the policy enforcer 702 receives a user indication 712 and an item indication 714 via the interface 710, along with an indication of the type of security operation/check requested by the calling component (e.g., business logic layer 204). The user indication 712 identifies the user that is making the request that resulted in the security operation (e.g., the user currently logged into the application as identified by a user ID in the attribute store 404 of FIG. 4). The item indication 714 identifies the item that the identified user is trying to access that resulted in the security operation. The items that a user may attempt to access can vary by application (e.g., an asset in a database, a customer's loan information, another user's logon id or password, etc.).

Depending on the nature of the user indication, the control module 708 may access the business logic layer 204 of FIG. 2 for additional information regarding the requested security operation. The rule comparator 706 compares the received user and item indications 712 and 714 to the rules 704 to determine whether a rule indicates the requested security operation should pass or fail. Any additional information received by the control module 708 from the business logic layer 204 may also be compared to the rules 704, or the additional information may identify other checks to be performed. The comparator 706 then returns a result of the security operation (e.g., a pass or fail indication) to the component that requested the security operation (e.g., the business logic layer 204). The results of a failed or passed security operation are then dependent on the calling component.

Figure 8:
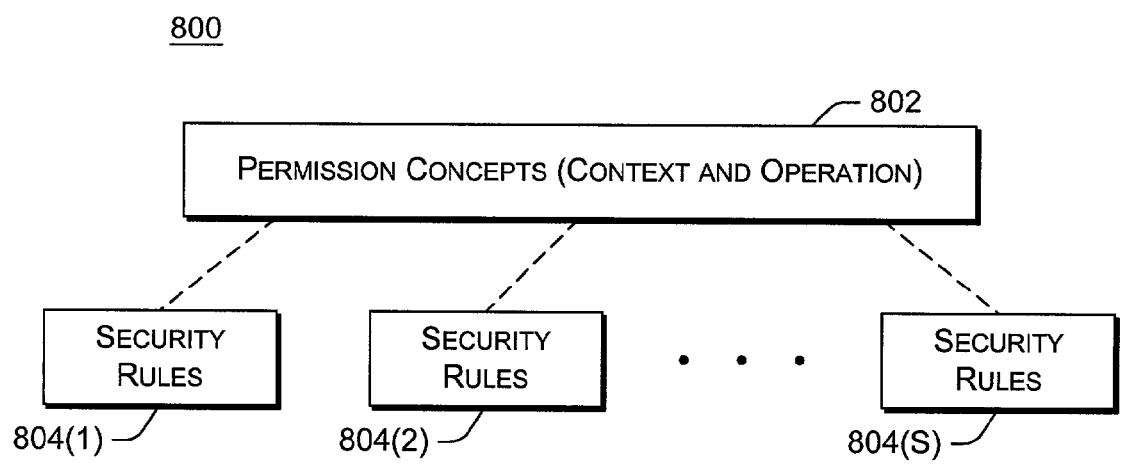
FIG. 8 illustrates an exemplary method of expressing security rules.

FIG. 8 illustrates an exemplary method 800 of expressing security rules. Initially, a set of high-level permission concepts 802 are defined. In the discussions herein, the high-level permission concepts 802 are referred to as the "context" and the "operation". The operation identifies a particular operation or action that may be defined (e.g., creation, deletion, modification, etc.) and the context identifies what a corresponding operation may be performed on (e.g., a user object, an asset object, etc.). Based on these high-level permission concepts 802, multiple security rules 804(1), 804(2), . . . , 804(S) can be defined that are specific to a particular application domain or business logic. These defined rules 804 are then used as the rules 704 of FIG. 7.

Returning to FIG. 7, the policy enforcer 702 can be invoked to perform a security operation by a variety of different components. In one implementation, the program controller 406 of FIG. 4 invokes a security check method of an instantiated object and identifies the user object to the security check method. The invoked security check method then invokes the policy enforcer 702, passing the user object (as indication 712) as well as an indication of the object that the requested operation affects (as indication 714), such as an asset in a database to the policy enforcer 702.

Alternatively, the policy enforcer 702 may be invoked in other manners, such as by another component interacting with or managing objects (e.g., the program controller 406 of FIG. 4). In some situations the indication of the object is inherent in the invocation of the policy enforcer 702 and only the user indication 712 need be explicitly passed to the policy enforcer 702. For example, an object may invoke the policy enforcer 702 for a security operation to determine whether a particular user (represented by a user object) is able to access the object invoking the policy enforcer. In this example, the item indication is implicitly passed to the policy enforcer 702 by nature of its being invoked by another object.

The interface 710 provides multiple different interfaces or methods that can be used to invoke one of multiple different security operations of the policy enforcer 702. Each interface receives an indication of the user and the item corresponding to the requested security operation. In one implementation, multiple sets of interfaces are provided by the interface 710: one set that is invoked by a component where the item indication is implicit, and another set that is invoked by a component where the item indication is explicitly identified. An exemplary interface 710 provides the following five different interfaces or methods: canBeApprovedBy, canBeCreatedBy, canBeDeletedBy, canBeModifiedBy, and canBeViewedBy.

The canBeApprovedBy method tests whether the identified item can be approved by the specified user. For example, approval typically happens for entities such as quotes or orders where a supervisor approves or rejects an action taken by other personnel or through automated processes. The rules which determine whether an item can be approved by a particular user can be arbitrary and partially based on other information available in the business logic other than the item and the user. The canBeApprovedBy method returns true (pass) if the user can approve or reject an action taken on the object or false (fail) if the user cannot perform those actions.

The canBeCreatedBy method tests whether the identified item of the specified type (e.g., class) can be created by the specified user. This method is used when testing whether or not a user can create a certain type of persistent item (e.g., a persistent object). Persistent items are those that are stored into a database or other type of long-term storage for future retrieval. The business rules which determine whether an item can be created by a particular user can be arbitrary and partially based on other information available in the business logic other than the item and the user. The canBeCreatedBy method returns true (pass) if the user can create the item in question, false (fail) otherwise.

The canBeDeletedBy method tests whether the identified item can be deleted (destroyed) by the specified user. This method is used when testing whether or not a user can delete an individual persistent item. The business rules which determine whether an item can be deleted by a particular user can be arbitrary and partially based on other information available in the business logic other than the object and the user. The canBeDeletedBy method returns true (pass) if the user can delete the item in question, false (fail) otherwise.

The canBeModifiedBy method tests whether the identified item can be modified (changed) by the specified user. This method is used when testing whether or not a user can modify an individual persistent item. The business rules which determine whether an item can be modified by a particular user can be arbitrary and partially based on other information available in the business logic other than the item and the user. The canBeModifiedBy method returns true (pass) if the user can modify the item in question, false (fail) otherwise.

The canBeViewedBy method tests whether a user can examine the details of a particular item. The business rules which determine that a given item may be examined by the specific user can be arbitrary and partially based on other information available in the business logic other than the item and the user. The canBeViewedBy method returns true (pass) if the user can view the contents of the item in question, false (fail) otherwise.

When a security operation is requested, the policy enforcer 702 uses one or more of the rules 704 to determine whether to respond to the request with a pass or fail result. Each of the rules 704 is referred to as a permission assignment object 716, serving to assign one or more particular permissions to a particular user or group of users. Multiple such permission assignment objects 716(1), . . . , 716(P) can be included in the rules 704.

Each permission assignment object 716 includes a user field 718, a role field 720, a permission (grant/deny) field 722, and a duration field 724. The user field 718 identifies a particular user or group of users for which the permission assignment object 716 identifies permissions. The role field 720 identifies a set of one or more permissions, allowing multiple permissions to be grouped together under a single identifier. The role field 720 includes two or more additional fields: a name field 726 and a set of one or more permission fields 728(1), . . . , 728(R). The name field 726 is an identifier of the associated set of permissions 728. Each permission field 728 includes two additional fields to define a particular permission: a context field 730 and an operation field 732. The operation field 732 identifies a particular operation (e.g., creation, deletion, modification, etc.) and the context field 730 identifies what that particular operation is performed on (e.g., a user object, an asset object, etc.). Alternatively, the role field 720 may contain an individual permission (just a field 728) rather than a role (a name field 726 and permission field(s) 728).

The grant/deny field 722 of the permission assignment object 716 identifies whether the permission(s) identified in the role field 720 are granted or denied to the user identified in the user field 718. The duration field 724 identifies a time or duration associated with the permission(s) granted or denied by the permission assignment object 716. The time or duration may be specified in a variety of manners (e.g., a start time/date and a number of hours/days/months/etc. from the start time/date that the permission(s) are to last, an ending time/date past which the permission(s) are no longer to be applied, an indication that there is no time at which the permission(s) expire, and so forth).

The particular rules 704 that are included in the policy enforcer 702 vary by business logic. Thus, if a designer wishes to apply different rules because of a change in the business logic, the policy enforcer 702 can simply be swapped out with the new policy enforcer 702 including the new desired rules. The manner in which the policy enforcer 702 is invoked does not change, nor does the permission concept of defining permissions as contexts and operations. The underlying data in those specific permissions changes, but not the permission concepts.

The fields 716-732 may include the actual data for the information they represent or alternatively a pointer to the data. Using a pointer allows, for example, the same permission 728 to be identified multiple different permission assignment objects 716 and/or multiple different roles 720 without duplicating storage of the data of the permission 728 for each object and/or role.

An example set of permissions and associated roles can be seen in Tables 3 and 4 below. These can be used to assign permissions to particular users and/or groups of users by the system designer as he or she chooses. Table 3 describes the various defined permissions, while Table 4 identifies which role(s) the permissions are associated with (an "x" in a cell of Table 4 indicates that the identified permission is associated with the identified role). These permissions and roles are an example set that can be used in an asset sales domain, allowing clients to purchase and sell assets. A permission name is included for identification purposes, though it need not be stored in the rules 704 (and is not stored in the rules 704 in the illustrated example of FIG. 7).

TABLE 3

| Permission Name | Context | Operation | Description |
|---|---|---|---|
| External Search Asset | Asset | External Search | Search publicly available assets |
| Internal Search Own Asset | Asset | Internal Search Own | Search private assets owned by requestor's organization. Additional requirement: The object was created by the requestor (Object.getCreatedBy( ) == User.getID( )). |
| Internal Search All Asset | Asset | Internal Search All | Search all private assets |
| Create Asset | Asset | Create | Create assets |
| Externalize Asset | Asset | Externalize | Make an asset publicly available |
| Modify Asset | Asset | Modify | Modify any asset |
| View Asset | Asset | View | View any asset |
| Delete Asset | Asset | Delete | Delete assets |
| View My Quote | Quote | View Own | Quotes requested by me, created by me or created for me. Additional requirements: the object was created by me (Object.getCreatedBy( ) == User.getID( )), and created for me (Object.getCreatedFor( ) == User.getID( )). |
| View All Quote | Quote | View All | View all quotes |
| Respond Quote | Quote | Respond | Respond to a quote |
| Search For My Quote | Quote | Search Own | Search for quotes requested by me, created by me or created for me |
| Search For All Quote | Quote | Search All | Search for all quotes |
| Delete Quote | Quote | Delete | Delete any quote |
| See Quote Reports | Quote | See Reports | See all quote reports |
| Request For Quote | Quote | Request For | Create a request for quote |
| Create Quote | Quote | Create | Create quote |
| Modify Quote | Quote | Modify | Modify any quote |
| Create User | User | Create | Create user |
| Modify User | User | Modify | Modify any user. May not alter any user that has System Administration permission. |
| Disable User | User | Disable | Disable user |
| Delete user | User | Delete | Delete user. May not alter any user that has System Administration permission. May only delete users if and only if User ID not a foreign key reference in Assets and Quotes. |
| Modify My Info | User | Modify Own | Modify own User information (except permission levels and organization affinity) |
| Create ADP Customer | ADP Customer | Create | Create ADP customer |
| Search ADP Customer | ADP Customer | Search | Search for ADP customer |
| Modify ADP Customer | ADP Customer | Modify | Modify an ADP customer |
| Delete ADP Customer | ADP Customer | Delete | Delete ADP customer |
| System Admin | * | * | System administration privileges. System administrators can perform all other operations. |

TABLE 4

| Permission Name | Admin Role? | Internal Role? | Sales Force Role? | ADP Role? | User Role? |
|---|---|---|---|---|---|
| External Search Asset | x | x | x | x | x |
| Internal Search Own Asset | x | | | x | |
| Internal Search All Asset | x | x | x | | |
| Create Asset | x | x | | | |
| Externalize Asset | x | x | | | |
| Modify Asset | x | x | | | |
| View Asset | x | x | x | x | x |
| Delete Asset | x | | | | |
| View My Quote | x | x | x | x | x |
| View All Quote | x | x | x | | |
| Respond Quote | x | x | x | | |
| Search For My Quote | x | x | x | x | x |
| Search For All Quote | x | x | x | | |
| Delete Quote | x | x | | | |
| See Quote Reports | x | | | | |
| Request For Quote | x | x | x | x | x |
| Create Quote | x | x | | | |
| Modify Quote | x | x | | | |
| Create User | x | | | | |
| Modify User | x | | | | |
| Disable User | x | | | | |
| Delete User | x | | | | |
| Modify My Info | x | x | x | x | x |
| Create ADP Customer | x | | | | |
| Search ADP Customer | x | | | | |
| Modify ADP Customer | x | | | | |
| Delete ADP Customer | x | | | | |
| System Administration | | | | | |

The rule comparator 706 uses the rules 704 to determine what result to return in response to a requested security operation. The rules 704 can be interpreted as permissive (the default is that the security operation fails unless a rule indicates that it should succeed/pass), or alternatively as impermissive (the default is that the security operation succeeds/passes unless a rule indicates that it should fail). For example, assume that a user having an identifier of "Joe" desires to modify an asset. The policy enforcer 702 receives a security operation request to return a result indicating whether user Joe is able to modify the asset. The rule comparator 706 checks the rules 704 to determine whether there is any rule that grants user Joe permission to modify the asset. Referring to Tables 3 and 4, if a rule has been created that user Joe is granted permission to modify any asset ("Modify Asset" in Tables 3 and 4), such as assigning user Joe to the "Admin" or "Internal" roles, then the requested security operation succeeds/passes (otherwise, it fails).

Additionally, situations can arise where additional information is used by the policy enforcer to determine the result for a security operation. In these situations, the control module 708 communicates with the business logic layer 204 to determine what additional tests or comparisons need to be performed in order to obtain the result of the security operation. These may be additional comparisons required by the rule comparator 706, or alternatively additional instructions executed by the control module 708. For example, the Internal Search Own Asset permission in Tables 3 and 4 indicate that in order for the security operation to succeed the user ID (e.g., "Joe") indicated in the security operation request must be the same as the user ID of the user that created the item. This additional check can be performed by the control module 708, such as querying the item via a "getCreatedBy" interface on the item that causes the item to return the user ID of its creator. This additional check may also involve additional communication with the business logic layer 204. For example, the business logic layer 204 may include objects or other modules to return the creator of the item. By way of another example, the Modify User permission in Tables 3 and 4 indicate that in order for the security operation to succeed, the user object cannot be altered if it has System Administration permission.

Which security operations use additional information from the business logic can be identified in different manners. In one implementation, they are flagged in or coded into the control module 708 so that each time the security operation is invoked the control module 708 knows to access the business logic for the additional information. Alternatively, control module 708 may communicate with the business logic for each security operation and receive an indication from the business logic of either the additional information or an indication that there is no additional information.

If additional tests are to be carried out by the control module 708, then those can be carried out prior to, subsequent to, or concurrently with the rule comparison performed by the rule comparator 706. This can result, in some situations, in the rule comparator 706 not needing to perform any rule comparison. For example, if the user ID (e.g., "Joe") indicated in the security operation request must be the same as the user ID of the user that created the item in order for the security operation to succeed, and if the control module 708 determines that the two user IDs are not the same, then the rule comparator 706 need not check any of the rules 704 because it knows that, regardless of the rules 704, the result of the requested security operation is a fail.

Although only a single policy enforcer 702 is illustrated in FIG. 7, alternatively multiple policy enforcers 702 may be active simultaneously. The work can be distributed among multiple policy enforcers in a variety of different manners, such as where each request for security rule validation is processed by a particular policy enforcer depending upon the context of the request, the type of operation of the request, and so on.

The security policy enforcement 280 uses a layered approach that allows application developers to utilize readily understood security rules. These rules are defined in high-level concepts that are easily understood and used by developers. The rules are then mapped to specific business logic by the policy enforcer 702, which interprets the high-level terms in the context of specific business logic appropriate to the given application. This mapping and the business logic can easily be swapped out or tuned for specific instances and new mappings or business logic plugged in while allowing the application to continue to use the same high level constructs to reference the security rules. New security rules and business logic can be easily created for new applications whether in a similar problem domain or a new problem domain, and plugged into the architecture 110 as a new security policy enforcement 280. Additionally, the application can be developed rapidly utilizing the easily defined high-level rules only—the business logic need not be implemented right away. Thus, implementation can easily be done in such a manner that its delay will not hinder higher level application developers. Furthermore, this layered approach allows varying granularities of access control to be attained using one mechanism.

Figure 9:
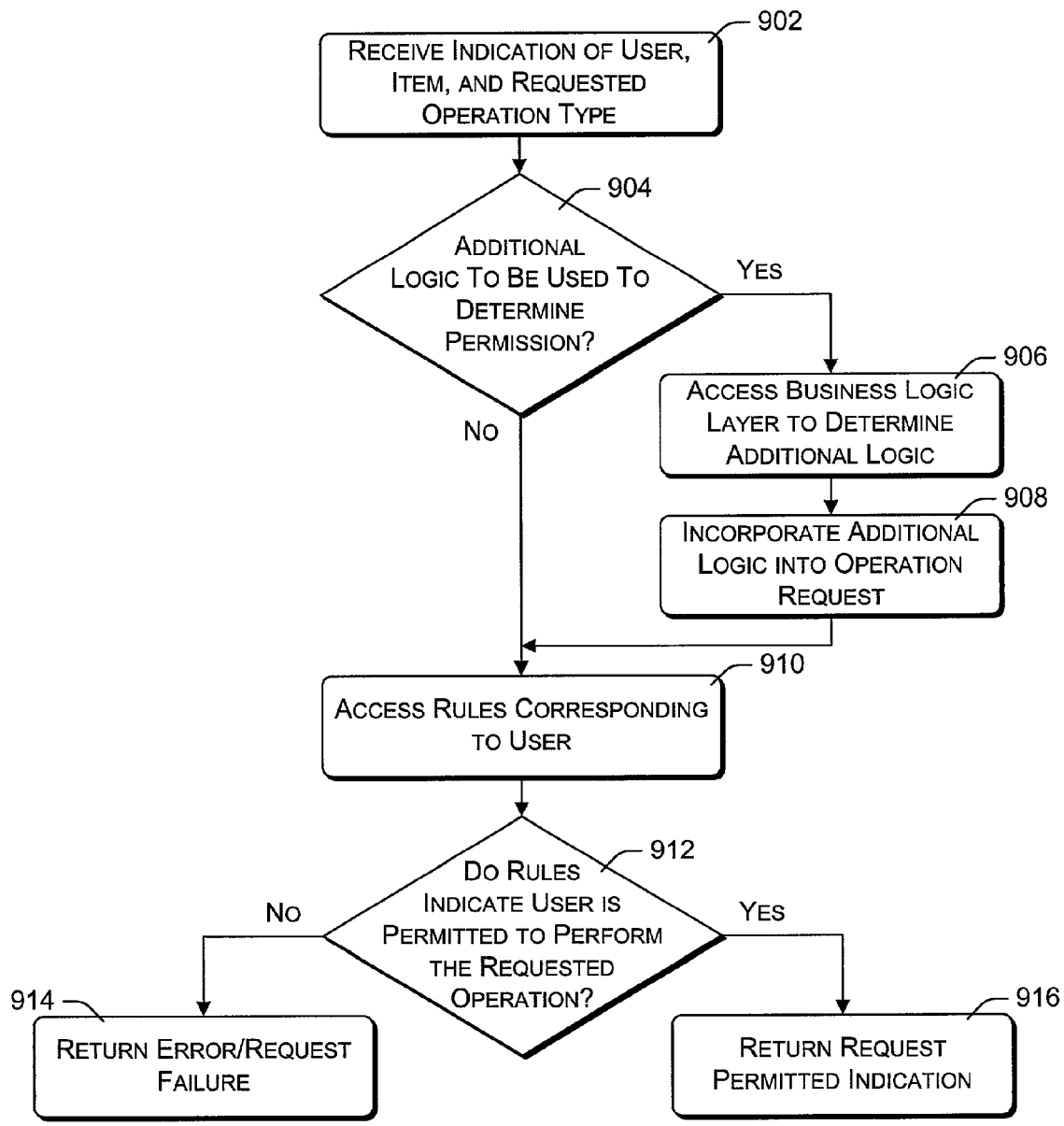
FIG. 9 is a flow diagram illustrating the operation of the security policy enforcement module.

FIG. 9 shows a general operation 900 of the security policy enforcement 280 of FIG. 2. The operation 900 is implemented as a software process of acts performed by execution of software instructions. Accordingly, the blocks illustrated in FIG. 9 represent computer-readable instructions, that when executed at the server system 106 of FIG. 1, perform the acts stipulated in the blocks. FIG. 9 is discussed with additional reference to elements of FIG. 7.

At block 902, the interface 710 receives an indication of a user, an item, and a requested security operation type. As discussed above, the item can be explicitly or implicitly identified.

At block 904, the control module 708 checks whether additional logic is to be used to determine whether to return a permission grant. If additional logic is to be used, then the control module 708 accesses the business logic layer 204 of FIG. 2 to determine what that additional logic is (block 906). At block 908, the control module 708 incorporates this additional logic into the operation request. This incorporation may involve generating additional rule tests to be carried out by the rule comparator 706, or alternatively additional tests to be carried out by the control module 708.

At block 910, the rule comparator 706 accesses the rules 704 corresponding to the user. At block 912, the rule comparator 706 checks whether the rules 704 indicate that the user is permitted to perform the requested operation. If the user is not permitted to perform the requested operation, then the rule comparator 706 returns an error or request failure result (block 914). However, if the user is permitted to perform the requested operation, then the rule comparator 706 returns a request permitted (or succeed/pass) indication (block 916).

Conclusion

The discussions herein are directed primarily to software modules and components. Alternatively, the systems and processes described herein can be implemented in other manners, such as firmware or hardware, or combinations of software, firmware, and hardware. By way of example, one or more Application Specific Integrated Circuits (ASICs) or Programmable Logic Devices (PLDs) could be configured to implement selected components or modules discussed herein.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. One or more computer-readable media comprising computer-executable instructions that, when executed by a processor, direct a the processor to perform acts including:
   receiving a request to perform an operation;
   checking whether to access a business logic module in order to generate a result for the requested operation, wherein the business logic module contains problem-solving logic that produces solutions for a particular problem domain, and wherein the business logic module employs interaction-based definitions in which a component which performs an operation associated with the request is defined by a series of request-response interaction definitions that can be satisfied to perform the operation;
   obtaining, from the business logic module, a set of zero or more additional tests to be performed in order to generate the result;
   performing each additional test in the set of tests if there is at least one test in the set of tests;
   checking a set of pluggable rules to determine the result of the requested operation; and
   returning, as the result, a failure indication if checking the business logic module or checking the set of pluggable rules indicates that the result is a failure, otherwise returning, as the result, a success indication,
   wherein the set of pluggable rules includes a plurality of permission assignment objects, wherein each of the permission assignment objects associates a user with a particular role, wherein each particular role is associated with one or more permissions, and wherein each of the one or more permissions identifies a particular operation and context on which the operation is to be performed.

2. One or more computer-readable media as recited in claim 1, wherein the receiving comprises receiving, from the business logic module, the request to perform the operation.

3. One or more computer-readable media as recited in claim 1, wherein the receiving comprises receiving, as part of the request, an indication of a user, and wherein the checking the set of pluggable rules comprises comparing an object associated with the user to the rules in the set of pluggable rules and determining whether the operation can be performed based at least in part on whether the user is permitted to perform the operation.

4. One or more computer-readable media as recited in claim 1, wherein the receiving comprises having one of a plurality of methods invoked.

5. One or more computer-readable media as recited in claim 1, wherein the set of pluggable rules is a set of security rules defined using high-level permission concepts.

6. One or more computer-readable media as recited in claim 5, wherein the high-level permission concepts include a type of operation to be performed and a context, wherein the context allows identification of what the type of operation to be performed is to be performed on.

7. One or more computer-readable media as recited in claim 6, wherein the type of operation is selected from the group consisting of creation, deletion, viewing, approval, and modification.

8. One or more computer-readable media as recited in claim 1, wherein the computer-executable instructions are implemented as an object.

9. One or more computer-readable media as recited in claim 1, wherein the computer-executable instructions further direct the processor to perform acts including:
   determining if at least one of the tests in the set of zero or more additional tests would indicate a result of failure; and
   returning, as the result, the failure indication without checking the set of pluggable rules.

10. One or more computer-readable media as recited in claim 1, wherein the set of pluggable rules can be replaced with another set of pluggable rules without altering the business logic module.

11. One or more computer-readable media as recited in claim 1, wherein the set of zero or more tests is selected from the group consisting of creation, deletion, viewing, approval, and modification.

12. One or more computer-readable media as recited in claim 1, wherein each of the permission assignment objects further identifies whether the one or more permissions in the particular role are granted to the user or denied to the user.

13. A method comprising:
   providing high-level permission concepts, including context and operation, for security rules;
   allowing a set of security rules to be defined using the high-level permission concepts, wherein the set of security rules allows permissions to be assigned to users of an application, in which the set of security rules includes a plurality of permission assignment objects, in which each of the permission assignment objects associates a user with a particular role, in which each particular role is associated with one or more permissions, and in which each of the one or more permissions identifies a particular operation and context on which the operation is to be performed; and
   determining, based at least in part on a permission assigned to a user, whether to permit an operation based on a request by the user,
   wherein the determining further comprises determining whether to permit the operation requested by the user based at least in part on accessing a business logic module to identify one or more additional tests to perform to determine if the operation is permitted, and further comprising performing the one or more additional tests, wherein the business logic module contains problem-solving logic that produces solutions for a particular problem domain, and wherein the business logic module employs interaction-based definitions in which a component which performs the operation is defined by a series of request-response interaction definitions that can be satisfied to perform the operation.

14. A method as recited in claim 13, further comprising returning a result of the detemining to the business logic module.

15. A method as recited in claim 13, wherein the high-level permission concepts include an operation and a context, wherein the operation allows identification of a type of operation to be performed and the context allows identification of what the operation is to be performed on.

16. A method as recited in claim 15, wherein the type of operation is selected from the group consisting of creation, deletion, viewing, approval, and modification.

17. A method as recited in claim 13, wherein the method is implemented in an object having a plurality of interfaces for requesting a determination as to whether to permit a plurality of operations including the operation requested by the user.

18. A method as recited in claim 13, wherein each of the permission assignment objects further identifies whether the one or more permissions in the particular role are granted to the user or denied to the user.

19. A method as recited in claim 13, wherein the type of operation is selected from the group consisting of creation, deletion, viewing, approval, and modification.

20. A method comprising:
receiving a request to perform an operation associated with business logic module, wherein the business logic module contains problem-solving logic that produces solutions for a particular problem domain, and wherein the business logic module employs interaction-based definitions in which a component which performs the operation is defined by a series of request-response interaction definitions that can be satisfied to perform the operation;
accessing a set of low-level rules, wherein the low-level rules, including at least one of modifying, deleting, viewing, approving, or creating, are defined in terms of high-level concepts, the low-level rules further include a plurality of permission assignment objects, wherein each of the permission assignment objects associates a user with a particular role, wherein each particular role is associated with one or more permissions, and wherein each of the one or more permissions identifies a particular operation and context on which the operation is to be performed;
checking whether a user requesting to perform the operation is entitled to perform the operation based at least in part on the set of low-level rules; and
returning an indication of whether the operation is allowed or not allowed,
wherein the set of low-level rules can be replaced with another set of low-level rules without altering the business logic module.

21. A method as recited in claim 20, wherein the checking further comprises checking whether the user is entitled to perform the operation based at least in part on accessing the business logic module to identify one or more additional tests to perform, and further comprising performing the one or more additional tests.

22. A method as recited in claim 21, further comprising returning the indication to the business logic module.

23. An architecture comprising:
a plurality of resources including a processor to process requests;
a business logic layer to process, based at least in part on the plurality of resources, requests received from a client, wherein the business logic layer contains problem-solving logic that produces solutions for a particular problem domain, and wherein the business logic layer employs interaction-based definitions in which a component which performs an operation corresponding to an individual request is defined by a series of request-response interaction definitions that can be satisfied to perform the operation; and
a pluggable security policy enforcement module, separate from the business logic layer, to enforce security restrictions on accessing information stored at the plurality of resources based on the operation corresponding to the individual request,
wherein the pluggable security policy enforcement module defines high-level permission concepts for security rules and further defines a set of security rules using the high-level permission concepts which include context and operation.

24. An architecture as recited in claim 23, wherein the operation allows identification of a type of operation to be performed and the context allows identification of what the type of operation is to be performed on.

25. An architecture as recited in claim 24, wherein the type of operation is selected from the group consisting of creation, deletion, viewing, approval, and modification.

26. An architecture as recited in claim 23, wherein the pluggable security policy enforcement module can be replaced with another pluggable security policy enforcement module to enforce different security restrictions without altering the business logic layer.

27. An architecture as recited in claim 23, wherein the pluggable security policy enforcement module is configured to determine, based at least in part on a permission assigned to a user and on one or more additional tests identified by accessing the business logic layer, whether to permit a type of operation to access information at the plurality of resources.

* * * * *